US009537769B2

(12) United States Patent
Bryant et al.

(10) Patent No.: US 9,537,769 B2
(45) Date of Patent: Jan. 3, 2017

(54) OPPORTUNISTIC COMPRESSION OF ROUTING SEGMENT IDENTIFIER STACKS

(71) Applicant: Cisco Technology, Inc., San Jose, CA (US)

(72) Inventors: Stewart F. Bryant, Redhill (GB); Daniel C. Frost, Middlesex (GB)

(73) Assignee: Cisco Technology, Inc., San Jose, CA (US)

( * ) Notice: Subject to any disclaimer, the term of this patent is extended or adjusted under 35 U.S.C. 154(b) by 113 days.

(21) Appl. No.: 14/449,632

(22) Filed: Aug. 1, 2014

(65) Prior Publication Data

US 2014/0369356 A1    Dec. 18, 2014

Related U.S. Application Data

(63) Continuation-in-part of application No. 14/210,837, filed on Mar. 14, 2014.

(Continued)

(51) Int. Cl.
*H04L 12/26* (2006.01)
*H04L 12/741* (2013.01)
(Continued)

(52) U.S. Cl.
CPC ............ *H04L 45/745* (2013.01); *H04L 45/04* (2013.01); *H04L 45/12* (2013.01); *H04L 45/46* (2013.01);
(Continued)

(58) Field of Classification Search
USPC .......... 370/389–392, 477–521; 709/232–238
See application file for complete search history.

(56) References Cited

U.S. PATENT DOCUMENTS 6,032,197 A * 2/2000 Birdwell ................. H04L 12/18
                                                              709/216
6,374,303 B1    4/2002 Armitage et al. ............ 709/242
(Continued)

OTHER PUBLICATIONS

Cisco Systems, Inc., "Introduction to Intermediate System-to-Intermediate System Protocol," published 1992-2002; pp. 1-25.

(Continued)

*Primary Examiner* — Man Phan
(74) *Attorney, Agent, or Firm* — Campbell Stephenson LLP

(57) ABSTRACT

A method and device are disclosed for opportunistic compression of routing segment identifiers. In one embodiment, the method includes participating in routing of a first data packet through a first node in a network, and subsequently entering into an arrangement with an adjacent node in the network. The first data packet includes a first plurality of routing segment identifiers, and additional data packets to be routed through the first node also include the first plurality of routing segment identifiers. The arrangement entered into includes representation of the first plurality of routing segment identifiers by a single compression identifier. The method further includes participating in routing of at least one of the additional data packets using the compression identifier instead of the first plurality of routing segment identifiers. In an embodiment, the device includes one or more network interfaces and a processor configured to perform the steps of the method.

22 Claims, 12 Drawing Sheets

Related U.S. Application Data

(60) Provisional application No. 61/791,242, filed on Mar. 15, 2013.

(51) Int. Cl.
*H04L 12/723* (2013.01)
*H04L 12/715* (2013.01)
*H04L 12/721* (2013.01)

(52) U.S. Cl.
CPC ............ *H04L 45/50* (2013.01); *H04L 45/507* (2013.01); *H04L 45/74* (2013.01); *H04L 45/38* (2013.01); *H04L 45/54* (2013.01)

(56) References Cited

U.S. PATENT DOCUMENTS

| | | | |
|---|---|---|---|
| 6,577,600 B1 | 6/2003 | Bare | 370/238 |
| 6,647,428 B1 | 11/2003 | Bannai et al. | 709/245 |
| 6,963,570 B1* | 11/2005 | Agarwal | H04L 1/0009 370/310.2 |
| 7,023,846 B1 | 4/2006 | Andersson et al. | 370/389 |
| 7,031,253 B1 | 4/2006 | Katukam et al. | 370/222 |
| 7,031,607 B1 | 4/2006 | Aswood Smith | 398/51 |
| 7,061,921 B1 | 6/2006 | Sheth | 370/395.52 |
| 7,068,654 B1 | 6/2006 | Joseph et al. | 370/392 |
| 7,072,346 B2 | 7/2006 | Hama | 370/395.53 |
| 7,088,721 B1 | 8/2006 | Droz et al. | 370/395.1 |
| 7,154,416 B1* | 12/2006 | Savage | H03M 7/30 341/51 |
| 7,174,387 B1 | 2/2007 | Shand et al. | 709/238 |
| 7,180,887 B1* | 2/2007 | Schwaderer | H04L 45/742 370/351 |
| 7,260,097 B2 | 8/2007 | Casey | 370/392 |
| 7,286,479 B2 | 10/2007 | Bragg | 370/225 |
| 7,330,440 B1 | 2/2008 | Bryant | 370/254 |
| 7,359,377 B1 | 4/2008 | Kompella et al. | 370/389 |
| 7,420,992 B1* | 9/2008 | Fang | H04L 12/4633 370/477 |
| 7,430,210 B2 | 9/2008 | Havala et al. | 370/395.53 |
| 7,463,639 B1 | 12/2008 | Rekhter | 370/409 |
| 7,466,661 B1 | 12/2008 | Previdi et al. | 370/254 |
| 7,471,669 B1 | 12/2008 | Sabesan et al. | 370/351 |
| 7,564,803 B1 | 7/2009 | Minei et al. | 370/254 |
| 7,577,143 B1 | 8/2009 | Kompella | 370/392 |
| 7,602,778 B2* | 10/2009 | Guichard | H04L 45/50 370/389 |
| 7,610,330 B1* | 10/2009 | Quinn | H04L 45/02 709/201 |
| 7,773,630 B2 | 8/2010 | Huang et al. | 370/474 |
| 7,817,667 B2 | 10/2010 | Frederiksen et al. | 370/474 |
| 7,885,259 B2 | 2/2011 | Filsfils | 370/389 |
| 7,885,294 B2* | 2/2011 | Patel | H04L 45/04 370/202 |
| 7,894,352 B2 | 2/2011 | Kompella et al. | 370/248 |
| 7,894,458 B2* | 2/2011 | Jiang | H04L 12/18 370/401 |
| 7,940,695 B1 | 5/2011 | Bahadur et al. | 370/254 |
| 7,983,174 B1 | 7/2011 | Monaghan et al. | 370/242 |
| 8,064,441 B2 | 11/2011 | Wijnands et al. | 370/389 |
| 8,339,973 B1 | 12/2012 | Pichumani et al. | 370/248 |
| 8,422,514 B1 | 4/2013 | Kothari et al. | 370/466 |
| 8,542,706 B2 | 9/2013 | Wang et al. | 370/474 |
| 8,619,817 B1 | 12/2013 | Everson | 370/474 |
| 8,630,167 B2 | 1/2014 | Ashwood Smith | 370/255 |
| 8,711,883 B2* | 4/2014 | Kang | H04L 65/605 370/389 |
| 8,792,384 B2 | 7/2014 | Banerjee et al. | 370/254 |
| 8,953,590 B1 | 2/2015 | Aggarwal | 370/389 |
| 9,036,474 B2 | 5/2015 | Dibirdi et al. | 370/235 |
| 9,049,233 B2* | 6/2015 | Frost | H04L 69/166 |
| 9,112,734 B2 | 8/2015 | Edwards et al. | |
| 9,118,572 B2 | 8/2015 | Sajassi | |
| 2001/0037401 A1 | 11/2001 | Soumlya | 709/232 |
| 2002/0103732 A1 | 8/2002 | Bundy et al. | 705/35 |
| 2003/0016678 A1 | 1/2003 | Maeno | 370/400 |
| 2003/0026271 A1 | 2/2003 | Erb et al. | 370/401 |
| 2003/0126272 A1 | 7/2003 | Corl et al. | 709/230 |
| 2003/0142674 A1 | 7/2003 | Casey | 370/393 |
| 2003/0231634 A1 | 12/2003 | Henderson | 370/395.32 |
| 2004/0160958 A1 | 8/2004 | Oh | 370/395.1 |
| 2004/0174879 A1 | 9/2004 | Basso et al. | 370/392 |
| 2004/0196840 A1 | 10/2004 | Amrutur et al. | 370/389 |
| 2005/0213513 A1 | 9/2005 | Ngo | 370/254 |
| 2005/0259655 A1 | 11/2005 | Cuervo et al. | 370/392 |
| 2006/0002304 A1 | 1/2006 | Ashwood-Smith | 370/238 |
| 2006/0013209 A1 | 1/2006 | Somasundaram | 370/389 |
| 2006/0056397 A1 | 3/2006 | Aizu | 370/352 |
| 2006/0075134 A1* | 4/2006 | Aalto | H04L 45/00 709/238 |
| 2006/0080421 A1 | 4/2006 | Hu | 709/223 |
| 2006/0092940 A1 | 5/2006 | Ansari | 370/392 |
| 2006/0262735 A1 | 11/2006 | Guichard | 370/254 |
| 2006/0274716 A1 | 12/2006 | Oswal et al. | 370/349 |
| 2007/0019647 A1 | 1/2007 | Roy et al. | 370/392 |
| 2007/0053342 A1 | 3/2007 | Sierecki | 370/351 |
| 2007/0058638 A1 | 3/2007 | Guichard et al. | 370/395.31 |
| 2007/0189291 A1 | 8/2007 | Tian | 370/390 |
| 2007/0245034 A1 | 10/2007 | Retana | 709/238 |
| 2008/0002699 A1 | 1/2008 | Rajsic | 370/392 |
| 2008/0037117 A1 | 3/2008 | Tanaka | 370/471 |
| 2008/0075016 A1 | 3/2008 | Ashwood-Smith | 370/252 |
| 2008/0075117 A1 | 3/2008 | Tanaka | 370/471 |
| 2008/0084881 A1 | 4/2008 | Dharwadkar et al. | 370/392 |
| 2008/0101227 A1 | 5/2008 | Fujita et al. | 370/232 |
| 2008/0101239 A1 | 5/2008 | Good | 370/235 |
| 2008/0172497 A1 | 7/2008 | Mohan et al. | 709/249 |
| 2008/0189393 A1 | 8/2008 | Wagner | 709/218 |
| 2008/0192762 A1 | 8/2008 | Kompella et al. | 370/395.53 |
| 2008/0225864 A1 | 9/2008 | Aissaoui et al. | 370/401 |
| 2008/0253367 A1 | 10/2008 | Ould-Brahim | 370/389 |
| 2008/0259820 A1 | 10/2008 | White et al. | 370/255 |
| 2009/0041038 A1 | 2/2009 | Martini et al. | 370/401 |
| 2009/0067445 A1 | 3/2009 | Diguet | 370/419 |
| 2009/0080431 A1 | 3/2009 | Rekhter | 370/392 |
| 2009/0135815 A1 | 5/2009 | Pacella | 370/389 |
| 2010/0063983 A1 | 3/2010 | Groarke et al. | 707/803 |
| 2010/0088717 A1 | 4/2010 | Candelore et al. | 725/32 |
| 2010/0124231 A1 | 5/2010 | Kompella | 370/40 |
| 2010/0142548 A1 | 6/2010 | Sheth | 370/410 |
| 2010/0220739 A1 | 9/2010 | Ishiguro | 370/401 |
| 2010/0232435 A1 | 9/2010 | Jabr | 370/392 |
| 2010/0284309 A1 | 11/2010 | Allan et al. | 370/256 |
| 2011/0228780 A1 | 9/2011 | Ashwood-Smith | 370/392 |
| 2011/0268114 A1 | 11/2011 | Wijnands et al. | 370/389 |
| 2011/0280123 A1 | 11/2011 | Wijnands et al. | 370/228 |
| 2011/0286452 A1 | 11/2011 | Balus | 370/390 |
| 2012/0044944 A1 | 2/2012 | Kotha et al. | 370/401 |
| 2012/0069740 A1 | 3/2012 | Lu et al. | 370/238 |
| 2012/0069845 A1 | 3/2012 | Carney et al. | 370/392 |
| 2012/0082034 A1 | 4/2012 | Vasseur | 370/235 |
| 2012/0120808 A1 | 5/2012 | Nandagopal et al. | 370/238 |
| 2012/0213225 A1 | 8/2012 | Subramanian et al. | 370/392 |
| 2012/0218884 A1 | 8/2012 | Kini | 370/228 |
| 2012/0307629 A1 | 12/2012 | Vasseur | 370/228 |
| 2013/0003728 A1 | 1/2013 | Kwong et al. | 370/389 |
| 2013/0051237 A1 | 2/2013 | Ong | 370/237 |
| 2013/0077476 A1 | 3/2013 | Enyedi | 370/225 |
| 2013/0077626 A1 | 3/2013 | Keesara et al. | 370/390 |
| 2013/0142052 A1 | 6/2013 | Burbidge | 370/242 |
| 2013/0188634 A1 | 7/2013 | Magee | 370/389 |
| 2013/0219034 A1 | 8/2013 | Wang et al. | 709/222 |
| 2013/0258842 A1 | 10/2013 | Mizutani | 370/228 |
| 2013/0266012 A1 | 10/2013 | Dutta et al. | 370/392 |
| 2013/0266013 A1 | 10/2013 | Dutta et al. | 370/392 |
| 2013/0343204 A1 | 12/2013 | Geib et al. | 370/248 |
| 2014/0098675 A1 | 4/2014 | Frost et al. | 370/241.1 |
| 2014/0169370 A1 | 6/2014 | Filsfils et al. | 370/392 |
| 2014/0177638 A1 | 6/2014 | Bragg et al. | 370/395.3 |
| 2014/0254596 A1 | 9/2014 | Filsfils et al. | 370/392 |
| 2014/0269266 A1 | 9/2014 | Filsfils et al. | 370/228 |
| 2014/0269421 A1 | 9/2014 | Previdi et al. | 370/254 |
| 2014/0269422 A1 | 9/2014 | Filsfils et al. | 370/254 |
| 2014/0269698 A1 | 9/2014 | Filsfils et al. | 370/389 |

(56) References Cited

U.S. PATENT DOCUMENTS

| | | |
|---|---|---|
| 2014/0269699 A1 | 9/2014 | Filsfils et al. ............... 370/389 |
| 2014/0269721 A1 | 9/2014 | Bashandy et al. ........... 370/392 |
| 2014/0269725 A1 | 9/2014 | Filsfils et al. ............... 370/392 |
| 2014/0269727 A1 | 9/2014 | Filsfils et al. ............... 370/392 |
| 2014/0286195 A1 | 9/2014 | Fedyk ........................... 370/254 |
| 2014/0317259 A1 | 10/2014 | Previdi et al. ............... 709/223 |
| 2014/0341222 A1 | 11/2014 | Filsfils et al. ............. 370/395.5 |

OTHER PUBLICATIONS

Eckert, T., "Traffic Engineering for Bit Index Explicit Replication BIER-TE, draft-eckert-bier-te-arch-00," Network Working Group, Internet-Draft, Mar. 5, 2015, pp. 1-21.

Eckert, T., et al., "Traffic Engineering for Bit Index Explicit Replication BIER-TE, draft-eckert-bier-te-arch-01," Network Working Group, Internet-Draft, Jul. 5, 2015, pp. 1-23.

Eckert, Toerless et al., "Traffic Engineering for Bit Indexed Explicit Replication", U.S. Appl. No. 14/814,574, filed Jul. 31, 2015; consisting of Specification, Claims, and Abstract (75 pages); and Drawings (18 sheets).

Eckert, Toerless et al., "Traffic Engineering for Bit Indexed Explicit Replication", U.S. Appl. No. 14/862,915, filed Sep. 23, 2015; consisting of Specification, Claims, and Abstract (75 pages); and Drawings (18 sheets).

Francois, Pierre Jean Rene; "Loop Avoidance During Network Convergence in Switched Networks"; U.S. Appl. No. 14/319,353, filed Jun. 30, 2014; consisting of Specification, Claims and Abstract (29 pages); and Drawings (6 sheets).

Previdi, Stefano B.; "Segment Routing Using a Remote Forwarding Adjacency Identifier"; U.S. Appl. No. 14/334,300, filed Jul. 17, 2014; consisting of Specification, Claims and Abstract (23 pages); and Drawings (8 sheets).

Previdi, Stefano B; "Segment Routing Extension Headers"; U.S. Appl. No. 14/212,084, filed Mar. 14, 2014; consisting of Specification, Claims and Abstract (43 pages); and Drawings (17 sheets).

Filsfils, C. et al., Cisco Systems, Inc., "Segment Routing Interoperability with LDP", draft-filsfils-spring-segment-routing-ldp-interop-01.txt; Apr. 18, 2014; pp. 1-16.

Aggarwal, R. and Y. Rekhter, Juniper Networks; E. Rosen, Cisco Systems, Inc.; "MPLS Upstream Label Assignment and Context Specific Label Space;" Network Working Group; Internet Draft; Jan. 2005; pp. 1-8.

Awduche, Daniel O., et al., "RSVP-TE: Extensions to RSVP for LSP Tunnels," Network Working Group, Internet-Draft, Feb. 2001, pp. 1-12.

Awduche, Daniel O., et al., "RSVP-TE: Extensions to RSVP for LSP Tunnels," Network Working Group, Request for Comments 3209, Dec. 2001, pp. 1-61.

Backes, P. and Rudiger Geib, "Deutsche Telekom AG's Statement About IPR Related to Draft-Geig-Spring-OAM-Usecase-01," Aug. 23, 2012, pp. 1-2.

Bryant, S. et al., Cisco Systems, "IP Fast Reroute Using Tunnels-draft-bryant-ipfrr-tunnels-03", Network Working Group, Internet-Draft, Nov. 16, 2007, pp. 1-30.

Bryant, S., et al., Cisco Systems, "Remote LFA FRR," draft-ietf-rtgwg-remote-lfa-04, Network Working Group, Internet-Draft, Nov. 22, 2013, pp. 1-24.

Crabbe, E., et al., "PCEP Extensions for MPLS-TE LSP Protection With Stateful PCE Draft-Crabbe-PCE-Stateful-PCT-Protection-00," Network Working Group, Internet-Draft, Apr. 2013, pp. 1-12.

Crabbe, E., et al., Stateful PCE Extensions for MPLS-TE LSPs, draft-crabbe-pce-statement-pce-mpls-te-00; Network Working Group, Internet-Draft, Apr. 15, 2013, pp. 1-15.

Deering, S., et al., Cisco, Internet Protocol, Version 6 (IPv6) Specification, Network Working Group, Request for Comments 2460, Dec. 1998, pp. 1-39.

Farrel, A., et al., Old Dog Consulting, A Path Computation Element (PCE)—Based Architecture, Network Working Group, Request for Comments 4655, Aug. 2006, pp. 1-80

Farrel, A., et al., Old Dog Consulting, Inter-Domain MPLS and GMPLS Traffic Engineering—Resource Reservation Protocol-Traffic Engineering (RSVP-TE) Extensions, Network Working Group, Request for Comments 5151, Feb. 2008.

Fedyk, D., et al., Alcatel-Lucent, Generalized Multiprotocol Label Switching (GMPLS) Control Ethernet Provider Backbone Traffic Engineering (PBB-TE), Internet Engineering Task Force (IETF), Request for Comments 6060, Mar. 2011, pp. 1-20.

Filsfils, C., et al., Cisco Systems, Inc., "Segment Routing Architecture," draft-filsfils-rtgwg-segment-routing-00, Jun. 28, 2013, pp. 1-28.

Filsfils, C., et al., Cisco Systems, Inc., "Segment Routing Architecture," draft-filsfils-rtgwg-segment-routing-01, Network Working Group, Internet-Draft, Oct. 21, 2013, pp. 1-28.

Frost, D., et al., Cisco Systems, Inc., "MPLS Generic Associated Channel (G-Ach) Advertisement Protocol," draft-ietf-mpls-gach-adv-00, Internet-Draft, Jan. 27, 2012, pp. 1-17.

Frost, D., et al., Cisco Systems, Inc., "MPLS Generic Associated Channel (G-Ach) Advertisement Protocol," draft-ietf-mpls-gach-adv-08, Internet-Draft, Jun. 7, 2013, pp. 1-17.

Frost, D., et al., Cisco Systems, Inc., "MPLS Generic Associated Channel (G-Ach) Advertisement Protocol," Request for Comments 7212, Jun. 2014, pp. 1-23.

Geib, R., "Segment Routing Based OAM Use Case," IETF 87, Gerlin, Jul./Aug. 2013, pp. 1-3.

Geib, R., Deutsch Telekom, "Use Case for a Scalable and Topology Aware MPLS data plan monitoring System," draft-geib-spring-oam-usecase-00; Internet-Draft, Oct. 17, 2013, pp. 1-11.

Geib, R., Deutsch Telekom, "Use Case for a Scalable and Topology Aware MPLS data plan monitoring System," draft-geib-spring-oam-usecase-01; Internet-Draft, Feb. 5, 2014, pp. 1-10.

Gredler, H., et al., Juniper Networks, Inc., "Advertising MPLS Labels in IS-IS draft-gredler-isis-label-advertisement-00," Internet-Draft; Apr. 5, 2013; pp. 1-13.

Gredler, H. et al., hannes@juniper.net, IETF87, Berlin, "Advertising MPLS LSPs in the IGP," draft-gredler-ospf-label-advertisement, May 21, 2013; pp. 1-14.

Guilbaud, Nicolas and Ross Cartlidge, "Google—Localizing Packet Loss in a Large Complex Network," Feb. 5, 2013, pp. 1-43.

Imaizumi, H., et al.; Networks, 2005; "FMEHR: An Alternative Approach to Multi-Path Forwarding on Packed Switched Networks," pp. 198-201.

Kompella, K. et al, Juniper Networks, "Label Switched Paths (LSP) Hierarchy with Generalized Multi-Protocol Label Switching (GMPLS) Traffic Engineering (TE)," Network Working Group, Request for Comments 4206, Oct. 2005, pp. 1-14.

Kompella, K., et al., Juniper Networks, Inc., "Detecting Multi-Protocol Label Switched (MPLS) Data Plane Failures," Network Working Group, Request for Comments 4379, Feb. 2006, pp. 1-50.

Kompella, K. et al., Juniper Networks,"Virtual Private LAN Service (VPLS) Using BGP for Auto-Discovery and Signaling," Network Working Group, Request for Comments 4761, Jan. 2007, pp. 1-28.

Kumar, N. et al., Cisco Systems, Inc., "Label Switched Path (LSP) Ping/Trace for Segment Routing Networks Using MPLS Dataplane," draft-kumar-mpls-spring-lsp-ping-00, Oct. 21, 2013, pp. 1-12.

Kumar, N. et al, "Label Switched Path (LSP) Ping/Trace for Segment Routing Networks Using MPLS Dataplane," draft-kumarkini-mpls-spring-lsp-ping-00, Network Work Group, Internet-Draft, Jan. 2, 2014, pp. 1-15.

Previdi, S. et al., Cisco Systems, Inc., "Segment Routing with IS-IS Routing Protocol, draft-previdi-filsfils-isis-segment-routing-00," IS-IS for IP Internets, Internet-Draft, Mar. 12, 2013, pp. 1-27.

Previdi, S. et al., Cisco Systems, Inc., "Segment Routing with IS-IS Routing Protocol, draft-previdi-filsfils-isis-segment-routing-00," Internet-Draft, Mar. 20, 2013, A55, pp. 1-27.

Raszuk, R., NTT 13, "MPLS Domain Wide Labels," draft-raszuk-mpls-domain-wide-labels-00, MPLS Working Group, Internet-Draft, Jul. 14, 2013, pp. 1-6.

Rosen, E. et al., Cisco Systems, Inc., "BGP/MPLS VPNs", Network Working Group, Request for Comments: 2547; Mar. 1999, pp. 1-26.

Sivabalan, S., et al.; "PCE-Initiated Traffic Engineering Path Setup in Segment Routed Networks; draft-sivabalan-pec-segmentrouting-

(56) References Cited

OTHER PUBLICATIONS 00.txt," Internet Engineering Task Force, IETF; Standard Working Draft, Internet Society (ISOC) 4, Rue Des Falaises CH-1205, Geneva, Switzerland, Jun. 2013, pp. 1-16.

Tian, Albert J. et al., Redback Networks, "Source Routed MPLS LSP Using Domain Wide Label, draft-tian-mpls-lsp-source-route-01.txt", Network Working Group, Internet Draft, Jul. 2004, pp. 1-12.

Vasseur, JP, et al.; Cisco Systems, Path Computation Element (PCE) Communication Protocol (PCEP): Request for Comments: 5440, Internet Engineering Task Force, IETF; Standard, Internet Society (ISOC) 4, Rue Des Falaises CH-1205, Geneva, Switzerland, chapters 4-8, Mar. 2009; pp. 1-87.

Wijnands, Ijsbrand and Bob Thomas, Cisco Systems, Inc,; Yuji Kamitc and Hitoshi Fukuda, NTT Communications; "Multicast Extensions for LDP;" Network Working Group; Internet Draft; Mar. 2005; pp. 1-12.

Li, T., et al., Redback Networks, Inc., "IS-IS Extensions for Traffic Engineering," Network Working Group, Request for Comments 5305, Oct. 2008, 17 pages.

Vasseur, JP, et al.; Cisco Systems, Inc. "A Link-Type Sub-TLV to Convey the Number of Traffic Engineering Label Switched Paths Signaled with Zero Reserved Bandwidth Across a Link," Network Working Group, Request for Comments 5330; Oct. 2008, 16 pages.

Eckert, Toerless et al., "Failure Protection for Traffic-Engineered Bit Indexed Explicit Replication", U.S. Appl. No. 15/054,480, filed Feb. 26, 2016; consisting of Specification, Claims, Abstract, and Drawings (76 pages).

Psenak, Peter et al., "Enforcing Strict Shortest Path Forwarding Using Strict Segment Identifiers" U.S. Appl. No. 15/165,794, filed May 26, 2016; consisting of Specification, Claims, Abstract, and Drawings (52 pages).

Alcatel-Lucent, "Segment Routing and Path Computation Element—Using Traffic Engineering to Optimize Path Placement and Efficiency in IP/MPLS Networks"; Technology White Paper; 2015; 28 pages.

Awduche, D. et al., "Requirements for Traffic Engineering Over MPLS"; Network Working Group; Request for Comments: 2702; Sep. 1999; pp. 1-29.

Awduche, D. et al., "Overview and Principles of Internet Traffic Engineering"; Network Working Group; Request for Comments: 3272; May 2002; pp. 1-71.

Filsfils, C. et al., "Segment Routing Architecture"; draft-ietf-spring-segment-routing-07; Network Working Group, Internet-Draft; Dec. 15, 2015; pp. 1-24.

Filsfils, C. et al., "Segment Routing Use Cases", draft-filsfils-rtgwg-segment-routing-use-cases-02; Network Working Group; Internet-Draft; Oct. 21, 2013; pp. 1-36.

Previdi, S. et al., "IS-IS Extensions for Segment Routing"; draft-ietf-isis-segment-routing-extensions-06; IS-IS for IP Internets, Internet-Draft; Dec. 14, 2015; pp. 1-39.

Psenak, P., et al. "OSPF Extensions for Segment Routing", draft-ietf-ospf-segment-routing-extensions-05; Open Shortest Path First IGP; Internet-Draft; Jun. 26, 2015; pp. 1-29.

* cited by examiner

| Flow ID 610 | Segment IDs 612 | | | | Flow Rank 614 | |
|---|---|---|---|---|---|---|
| | Pos. 1 | Pos. 2 | Pos. 3 | Pos. 4 | Volume | Perform. |
| A | N2 | N5 | A56 | N20 | 1 | 2 |
| B | N2 | N5 | A57 | N20 | 3 | 1 |
| C | N3 | N9 | A913 | N20 | 2 | 3 |
| D | N3 | N9 | A912 | N20 | 4 | 4 |

US 9,537,769 B2

OPPORTUNISTIC COMPRESSION OF ROUTING SEGMENT IDENTIFIER STACKS

RELATED APPLICATIONS

This application is a continuation-in-part of U.S. patent application Ser. No. 14/210,837, entitled "Seamless Segment Routing," filed Mar. 14, 2014, which in turn claims priority to U.S. Provisional Patent Application Ser. No. 61/791,242, entitled "Segment Routing," filed Mar. 15, 2013, both of which are hereby incorporated by reference in their entirety and for all purposes as if completely and fully set forth herein.

TECHNICAL FIELD

This disclosure relates to networking and, more particularly, to optional optimization of network flows.

BACKGROUND

Network nodes are capable of receiving and forwarding packets being sent through a communications network. A network node may take the form of one or more routers, one or more bridges, one or more switches, one or more servers, or any other suitable communications processing device. A packet, which may also be referred to as a "message" herein, is a formatted unit of data that typically contains control information and payload data. Control information may include, for example: address information, error detection codes like checksums, and sequencing information. Control information is typically found in packet headers and trailers, and payload data is typically found in between the headers and trailers.

One type of control information included with a packet is routing information used to make packet forwarding decisions. In some cases this routing information includes identifiers for separate portions of the path to be taken by the packet.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Overview

Figure 1:
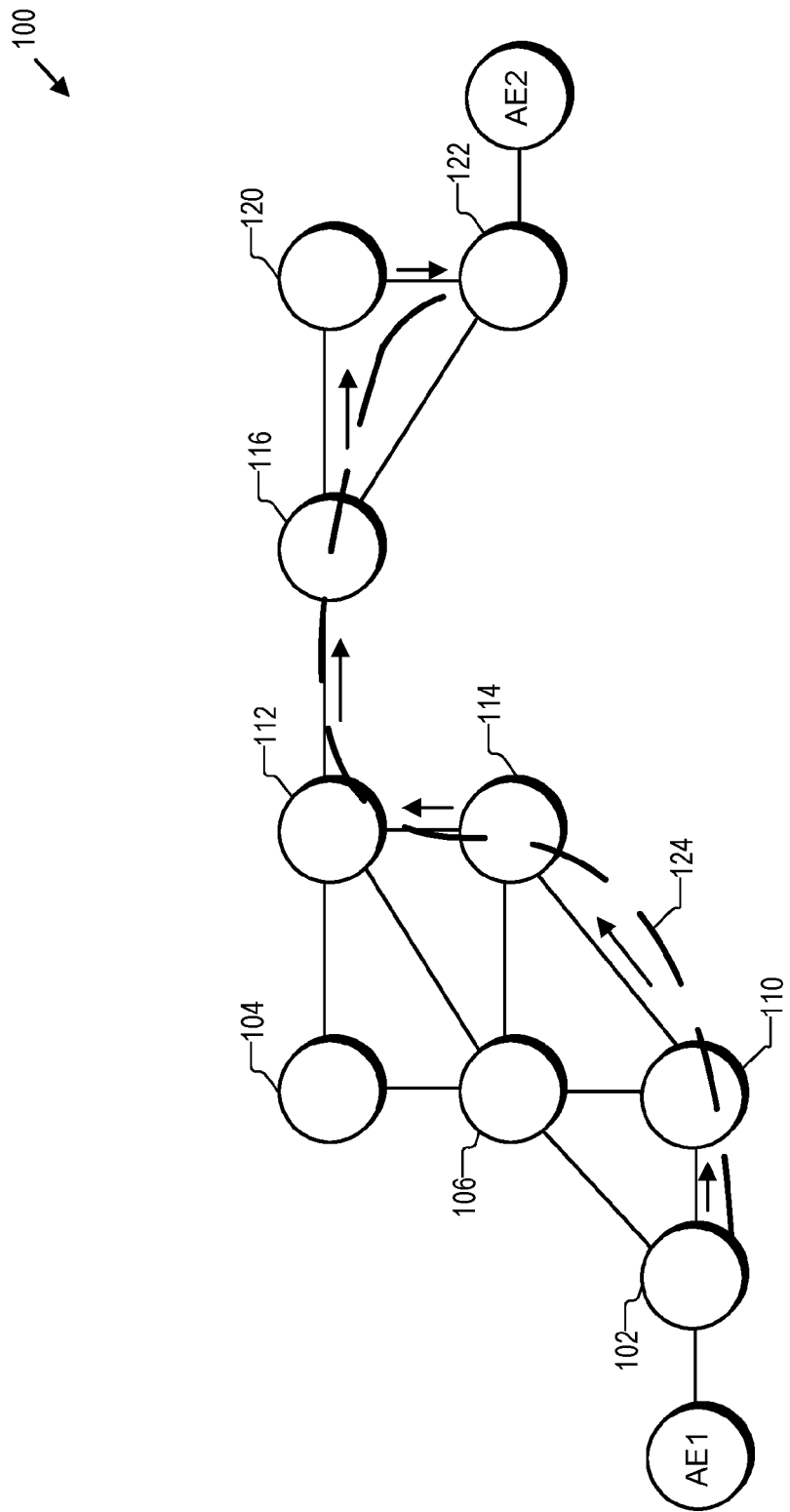
FIG. 1 is a diagram illustrating an example network.

A method and network device are disclosed for opportunistic compression of routing segment identifiers. In one embodiment, the method includes participating in routing of a first data packet through a first node in a network, and subsequently entering into an arrangement with an adjacent node in the network. In this embodiment, the first data packet includes a first plurality of routing segment identifiers, and additional data packets to be routed through the first node also include the first plurality of routing segment identifiers. The arrangement entered into in this embodiment includes representation of the first plurality of routing segment identifiers by a single compression identifier. The method in this embodiment further includes participating in routing of at least one of the additional data packets, where the additional data packet as routed includes the compression identifier instead of the first plurality of routing segment identifiers.

Routing

Routing is a process for forwarding network traffic (e.g., packets) to destinations. Commonly-employed packet forwarding mechanisms include Internet Protocol (IP) routing and Multiprotocol Label Switching (MPLS). IP routing uses IP addresses inside packet headers to make forwarding decisions. In contrast, MPLS nodes (i.e., nodes employing MPLS) can make forwarding decisions using short path identifiers called labels that are attached to packets. Segment routing (SR) is yet another packet forwarding mechanism, in which packet forwarding decisions are based on short path identifiers called segment identifiers attached to packets.

MPLS labels, segment identifiers, and other types of control information are often described as "attached to" a data packet, though this information is more accurately considered to be "put into" the packet, since control information, as well as the headers and trailers it appears in, is a part of the packet, along with the payload data. In the case of MPLS labels, the labels are included between the IP header and data link layer header of an IP packet, as discussed further below. "Attached to" or "added to" a packet as used herein with reference to routing labels or identifiers should be understood to indicate that the labels or identifiers are included within the packet.

Operation of routing mechanisms such as IP or MPLS can be described in terms of a "control plane" and a "data plane." The data plane, also referred to as the "forwarding plane," does the actual forwarding of packets coming into a node. Data plane decisions may involve accessing a forwarding table that relates the appropriate packet identifier (such as an IP address or MPLS label) to the specific network interface, or egress interface, the packet should be sent to in order to send it in the right direction. Generating such a forwarding table, based on a map, database, or other information reflecting the topology of the network, is a function of the control plane.

The control plane generates and updates its network topology information using one or more routing protocols. Within an autonomous system, an interior gateway protocol (IGP) is used for exchanging network topology information between nodes. An autonomous system, or routing domain, as used herein refers to a collection of interconnected network nodes under a common administration for purposes of network configuration. Exchange of routing information between autonomous systems is done using an exterior gateway protocol such as Border Gateway Protocol (BGP).

There are different types of IGPs, which vary in terms of, for example, the particular information exchanged between nodes, whether information is shared only with neighbor nodes or "flooded" throughout the autonomous system, and how often the exchanged information is updated. In one type of IGP called a link-state routing protocol, every router constructs a topological map of network connectivity in the form of a graph, showing which routers are connected to which other routers. Each router can use its map to independently calculate the best logical path from it to every possible destination in the network. The collection of best paths will then form the routing table. Examples of link-state routing protocols include the intermediate system to intermediate system (IS-IS) and the Open Shortest Path First (OSPF) protocols.

Messages called advertisements are used in IGPs to exchange information. Nodes in an IP network automatically exchange network topology information through IGP advertisements. MPLS is compatible with IP networks, and MPLS forwarding may be incorporated into a portion of an IP network such as the Internet, forming an IP/MPLS network. Like IP nodes, MPLS nodes in an IP/MPLS network automatically exchange network topology information through IGP advertisements.

IP Routing

IP routing uses IP forwarding tables in the data plane, which are created at nodes using routing information distributed between nodes via an IGP and/or exterior gateway protocol. In simple terms, IP forwarding tables map destination IP addresses to the next hops that packets take to reach their destinations. When a node receives a packet, the node can access a forwarding table using the destination address in the packet and look up a corresponding egress interface for the next hop. The node then forwards the packet through the egress interface. The next hop that receives the packet performs its own forwarding table lookup using the same destination IP address, and so on. In an embodiment, the protocol used in forwarding the packet is Internet Protocol version 4 (IPv4). In another embodiment, the protocol used is Internet Protocol version 6 (IPv6).

MPLS

MPLS is commonly employed in provider networks. Packets enter an MPLS network via an ingress edge node, travel hop-by-hop along a label-switched path (LSP) that typically includes one or more core nodes, and exit via an egress edge node. An MPLS network is also called an MPLS domain, where "MPLS domain" refers to a portion of a larger network containing devices configured to operate using MPLS.

Packets are forwarded along an LSP based on labels and Label Distribution Protocol (LDP) forwarding tables. Labels allow for the use of very fast and simple forwarding engines in the data plane of a network node, as compared to IP forwarding in which the destination IP address must be retrieved from the packet header at each node. Another benefit of MPLS is the elimination of dependence on a particular Open Systems Interconnection (OSI) model data link layer technology to forward packets.

A label is a short (compared, for example, to an IPv4 or IPv6 address), fixed-length, locally significant identifier. An MPLS label is implemented as a 32-bit identifier, with the lowest 20 bits allocated to the label value. The MPLS label is inserted between the IP header and data link layer header (for example, an Ethernet header) of a packet. In certain situations, such as when one MPLS domain is contained within another domain, more than one label is carried by a packet, forming a label stack. The uppermost label in a stack is closest to the data link layer header (i.e., closest to the outside of the packet). A node generally needs to read only the uppermost label in the stack for packet forwarding purposes.

MPLS labels can be associated with a forwarding equivalence class (FEC). Packets associated with the same FEC should follow the same LSP through the network. LSPs can be established for a variety of purposes, such as to guarantee a certain level of performance when transmitting packets, to forward packets around network congestion, to create tunnels for network-based virtual private networks, etc. In many ways, LSPs are no different than circuit-switched paths in ATM or Frame Relay networks, except that they are not dependent on a particular Layer 2 technology.

LDP is a protocol employed in the control planes of nodes. Two nodes, called LDP peers, can bi-directionally exchange labels on a FEC-by-FEC basis. LDP, along with underlying routing information provided using an IGP, can be used in a process of building and maintaining LDP forwarding tables that map labels and next-hop egress interfaces. These forwarding tables can be used to forward packets through MPLS networks.

When a packet is received by an ingress edge node of an MPLS network, the ingress node may determine a corresponding FEC. Characteristics for determining the FEC for a packet can vary, but typically the determination is based on the packet's destination IP address. Quality of Service for the packet or other information may also be used to determine the FEC. Once determined, the ingress edge node can access a table to select a label that is mapped to the FEC. The table may also map a next hop egress interface to the FEC. Before the ingress edge node forwards the packet to the next hop via the egress interface, the ingress node adds the label.

When a node receives a packet with a label (i.e., the incoming label), the node accesses an LDP forwarding table to read a next hop egress interface and another label (i.e., an outgoing label), both of which are mapped to the incoming label. Before the packet is forwarded via the egress interface, the node swaps the incoming label with the outgoing label. The next hop receives the packet with label and may perform the same process. This process is often called hop-by-hop forwarding along a non-explicit path. The penultimate node in the LSP may "pop" or remove the incoming label before forwarding the packet to an egress edge node in the network, which in turn may forward the packet towards its destination using the packet's destination address and an IP forwarding table.

When LDP is used to exchange labels and set up LSPs in an MPLS network, the LSPs are typically established based on a shortest-path algorithm. Multiple LSPs between the same source and destination nodes may also be established for purposes of load-balancing in the network, through, for example, the equal-cost multi-path (ECMP) load balancing often employed in IP networks. An alternative to using LDP in MPLS networks is to establish an explicit path using a protocol called Resource Reservation Protocol with Traffic Engineering (RSVP-TE) instead of or in addition to LDP. An explicit path or "tunnel" is specified using RSVP-TE when the initial node sends a request message from node to node along the length of the requested path, and the final node of the path confirms by sending back along the path an MPLS label to be used for the path. This label must then be added to the forwarding tables of the nodes along the path. This reservation process must be completed before any traffic can flow along the explicit path, and must be done again if the path is altered in response to a change in network topology or conditions.

To illustrate the concept of an MPLS LSP, FIG. 1 shows a portion of an example MPLS network 100 between access network nodes AE1 and AE2 which may connect, for example, to a traditional IP network. The MPLS network includes nodes 102-122 coupled together via communication links. An LSP 124 from node 102 to node 122 (denoted by dashed line and arrows) can be created so that all packets of a stream associated with a particular FEC sent from node 102 to node 122 will travel through the same set of nodes. Each node maintains information for an LSP established through it in an LDP forwarding table. Thus, if node 110 knows that node 114 is the next hop along the LSP for all packets received from node 102 that are destined for node 122, node 110 can forward the packets to node 114.

Figure 2:
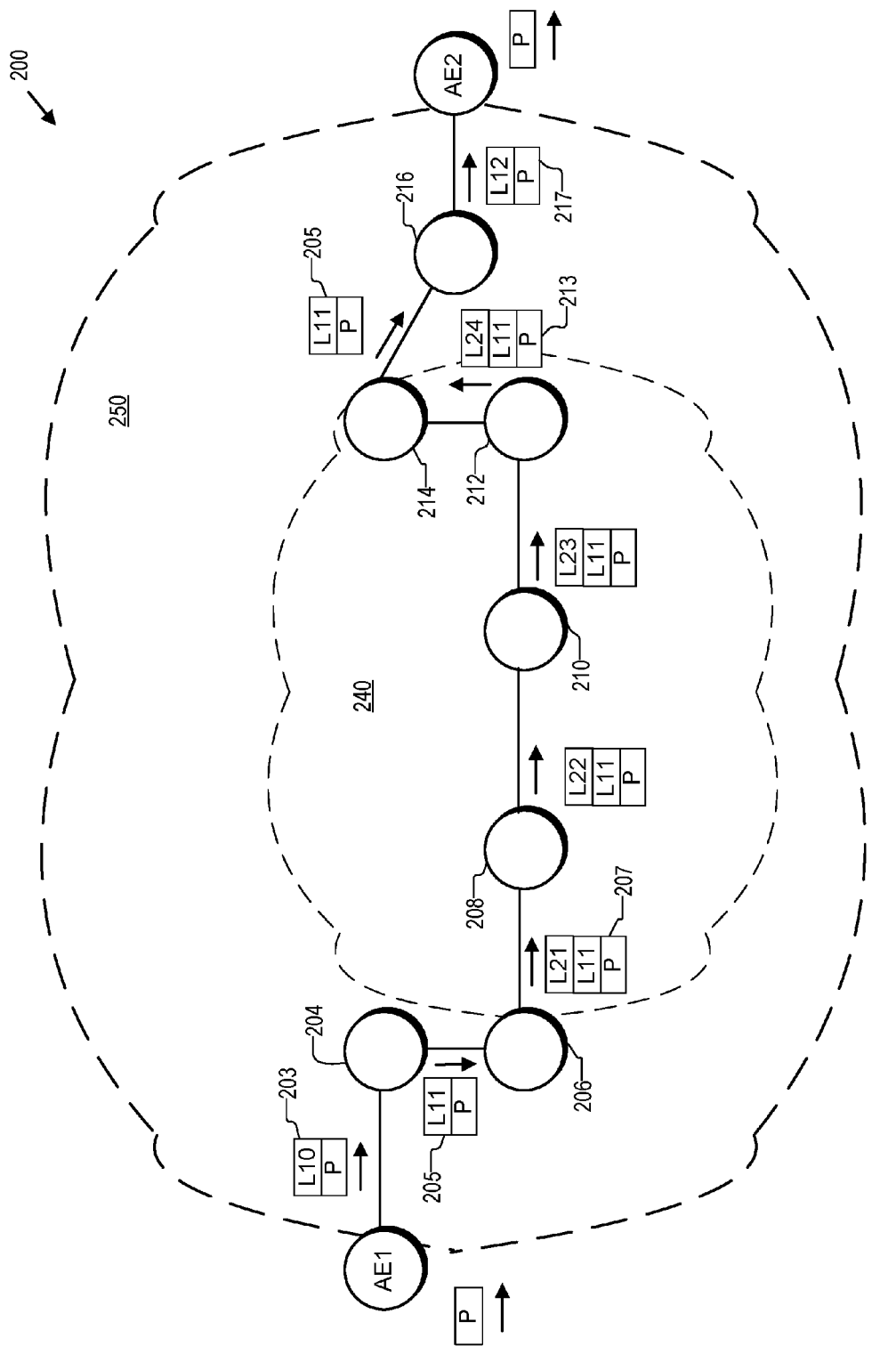
FIG. 2 is a diagram illustrating an example of nested MPLS networks and label stacks.

The network of FIG. 1 is within a single MPLS network, or domain. MPLS also allows for nesting of multiple MPLS domains, as illustrated in FIG. 2. Network portion 200 includes an MPLS domain 250 (denoted by dashed line boundary) between access network nodes AE1 and AE2. MPLS domain 240 is nested within domain 250. In the embodiment of FIG. 2, an IP packet P is received by node AE1, which is the ingress edge node for MPLS domain 250. As described above, node AE1 uses a destination IP address within the IP header of packet P to determine an FEC for the packet and select a label mapped to that FEC. In the embodiment of FIG. 2, MPLS label L10 is added to, or "pushed" to the label storage area of, packet P to form packet 203. Node 204 then accesses its LDP forwarding table to find the entry for label L10 and swaps label L10 with label L11 before forwarding the packet to node 206 as packet 205.

Node 206 is an ingress edge node for nested MPLS domain 240. As such, it operates in a similar manner to node AE1, by pushing a new label L21 onto a label stack for the packet to form packet 207. The current label L11 for domain 250 remains attached to (or stored within) packet 207, but is not accessed by nodes within nested domain 240. This addition of one or more MPLS labels to a packet with an existing label may be referred to as "label stacking". The uppermost label on a label stack corresponds to the outermost (farthest from the payload) label in the packet. Each node within domain 240 swaps the top label when forwarding the packet, pursuant to the appropriate entry in that node's LDP forwarding table, until the packet reaches egress edge node 214 for domain 240 as packet 213. In the embodiment of FIG. 2, node 214 removes the second MPLS label, leaving label L11 from domain 250 as the uppermost (in this case, only) label stored in the packet, thereby restoring packet 205. Label L11 is then swapped one more time by node 216 to form packet 217 before it is removed by egress edge node AE2, which then forwards the packet using traditional IP routing. In an alternate embodiment, node 212 may remove second-level label L23 rather than swapping it, and node 216 may remove first-level label L11 instead of swapping it, in a penultimate-hop popping (PHP) procedure as mentioned above.

In a nested MPLS domain arrangement such as that of FIG. 2, forwarding tables accessed by the interior nodes of each domain include entries only for the labels used in that domain—i.e., the uppermost labels in the stack. This can provide simpler forwarding tables that allow improved scaling properties for large networks. Because only the uppermost label is accessed by interior nodes in a nested domain, a variation of this approach can be useful for high-security applications like virtual private networks (VPNs). For example, a label identifying which VPN a packet is associated with may be placed in a label stack below the label used for routing. Although only two nested MPLS domains are illustrated in FIG. 2, an actual network is typically much larger and may include multiple nested domains with corresponding larger label stacks.

Segment Routing

Segment routing (SR) is a mechanism in which nodes forward packets using SR forwarding tables and segment identifiers (IDs). Like MPLS, segment routing enables a very fast and simple forwarding engine in the data plane of a node. Segment routing is not dependent on a particular Open Systems Interconnection (OSI) model data link layer technology to forward packets.

In an embodiment, segment routing differs significantly in the control plane from MPLS routing. Segment routing nodes (i.e., nodes employing SR) make packet forwarding decisions based on segment IDs as opposed to labels, and as a result SR nodes need not employ LDP in their control planes. Unless otherwise indicated, the SR nodes described below lack LDP in the control plane. Instead of being exchanged using a separate protocol such as LDP or RSVP-TE, segment identifiers are communicated among nodes using the IGP advertisements already employed to automatically exchange topography information in IP networks. In an embodiment, this IGP advertisement of SR identifiers is done through extensions to IGP protocols such as the IS-IS and OSPF protocols and to exterior gateway protocols such as BGP.

Certain embodiments of the segment routing segment routing methods and systems described herein are realized using data planes associated with other routing mechanisms, such as the Internet Protocol version 6 (IPv6) data plane or the MPLS data plane. In the case of the MPLS data plane, for example, segment identifiers are in one embodiment formatted as MPLS labels and included in an LDP forwarding table, so that the MPLS data plane is not altered. In the case of the IPv6 data plane, segment identifiers are in one embodiment included in an optional extension header provided for in the IPv6 specification. It should be understood that, unless otherwise indicated, any of the segment routing methods or systems described herein may be realized using the MPLS, IPv6, or any other data plane, in addition to a dedicated segment routing data plane.

Packets can enter an SR-enabled network via an ingress edge node, travel hop-by-hop along a segment path (SP) that includes one or more core nodes, and exit the network via an egress edge node. An SR-enabled network includes means of generating segment identifiers, communicating segment IDs among nodes, and forwarding packets based on segment IDs. These functions are described in more detail within the segment routing description below.

Like MPLS labels, segment IDs are short (compared, for example, to an IPv4 or IPv6 address) fixed-length identifiers. Segment IDs may correspond to a topological instruction, such as a segment of a network, or a service instruction, such as a service provided by a network node. Topological segments represent one-hop or multi-hop paths to SR nodes. Topological segments act as sub-paths that can be combined to form a segment path. Stacks of segment IDs can represent segment paths, and segment paths can be associated with FECs as is further described below.

There are several types of segment IDs including nodal segment IDs, adjacency segment IDs, area segment IDs, service segment IDs, etc. Nodal segment IDs (also called "node segment IDs") are typically assigned to nodes such that no two SR nodes belonging to an autonomous system are assigned the same nodal segment ID. In an embodiment, nodal segment IDs are assigned to nodes by a path computation element (PCE) server, or other control-plane server. In some embodiments, a user, such as a network administrator, detects a node coming online or joining a network and assigns the node a nodal segment ID. Nodal segment IDs can be mapped to unique SR node identifiers such as node loopback IP addresses (hereinafter node loopbacks). In one embodiment, all assigned nodal segment IDs are selected from a predefined ID range (e.g., [32, 5000]). In a further embodiment, a separate, smaller ID range for nodal segment IDs is assigned to each node, allowing a node to determine its own nodal segment ID or IDs within the assigned range. A nodal segment ID corresponds to a one-hop or a multi-hop path to an SR node assigned the nodal segment ID, as is more fully described below. In certain embodiments, multiple nodal segment IDs are assigned to the same node. Multiple nodal segment IDs for a node may, for example, allow alternate paths to the node to be defined for traffic engineering purposes. The converse situation is not permitted, however: a single nodal segment ID cannot be associated with more than one node.

An adjacency segment ID represents a direct link between adjacent SR nodes in a network. Links can be uniquely identified. For purposes of explanation only, this disclosure will identify a link using the loopbacks of nodes between which the link is positioned. To illustrate, for a link between two nodes identified by node loopback X and node loopback Y, the link will be identified herein as link XY. Because loopbacks are unique, link IDs referenced to loopbacks are unique. Link IDs should not be confused with adjacency segment IDs; adjacency segment IDs may not be unique within a network.

Each SR node can assign one or more distinct adjacency segment IDs for each of the node's links. Adjacency segment IDs are locally significant; separate SR nodes may assign the same adjacency segment ID, but that adjacency segment ID represents distinct links. In one embodiment, adjacency segment IDs are selected from a predefined range that is outside the predefined range for nodal segment IDs.

SR nodes can advertise routing information including nodal segment IDs bound to loopbacks, adjacency segment IDs mapped to link IDs, etc., using protocols such as IGP and/or BGP with SR extensions. Nodes can use the routing information they receive to create or update SR forwarding tables. To illustrate, SR nodes may in one embodiment use the routing information they receive and protocols such as open shortest path first (OSPF) with SR extensions in order to create topology maps of the network, which in turn can be used to identify next hop egress interfaces of shortest paths (SPTs) to respective node loopbacks. The identified SPT or next hop egress interfaces are then mapped to respective nodal segment IDs in an SR forwarding table. Nodes can also map their adjacency segment IDs to egress interfaces for respective links in SR forwarding tables. Because adjacency segment IDs are only locally significant, however, adjacency segment IDs should only be mapped in SR forwarding tables of the nodes that advertise the adjacency segment IDs. In other words, an SR node that advertises an adjacency segment ID should be the only node in the network area that has an SR forwarding table that maps the adjacency segment ID to an egress interface.

As noted above, SR enables segment paths (SPs), which can be used for transporting packets through a network. Segment paths can be associated with FECs, and can be established for a variety of purposes. Packets associated with the same FEC normally traverse the same segment path towards their destination. Nodes in segment paths make forwarding decisions based on segment IDs, not based on the contents (e.g., destination IP addresses) of packets. As such, packet forwarding in segment paths is not dependent on a particular Layer 2 technology.

Edge nodes and/or other devices (e.g., a centralized control plane server) of an SR network use routing information (nodal segment IDs bound to loopbacks, adjacency segment IDs mapped to link IDs, etc.) they receive in link advertisements to create ordered lists of segment IDs (i.e., segment ID stacks). Segment ID stacks correspond to respective segment paths. Individual segment IDs in a segment ID stack may correspond to respective segments or sub paths of a corresponding segment path.

When an SR ingress edge node receives a packet, the node or a centralized control plane server in data communication with the node, can select a segment path for the packet based on information contained in the packet. In one embodiment, a FEC may be calculated for the packet using the packet's destination address. In another embodiment, the FEC may be calculated using a User Datagram Protocol (UDP) port number in a UDP/IP implementation. The FEC is then used to select a segment ID stack mapped thereto. The ingress edge node can add the selected segment ID stack to the packet via an SR header. The packet with the segment ID stack is forwarded along and can traverse the segments of the SP in an order that corresponds to the list order of the segment IDs in the segment ID stack. A forwarding engine operating in the data plane of each SR node can use the top segment ID within the segment ID stack to look up the egress for the next hop. As the packet with the segment ID stack is forwarded along the SP in a hop-by-hop fashion, segment IDs can be popped off the top of the segment ID stack. In another embodiment, the stack of segment IDs remains unchanged as the packet is forwarded along the SP. In this embodiment, a pointer to an active segment ID in the segment ID stack can be advanced as the packet is forwarded along the SP. In contrast to MPLS, however, segment IDs are typically not swapped as the packet and attached segment ID stack are forwarded along the SP.

Figure 3:
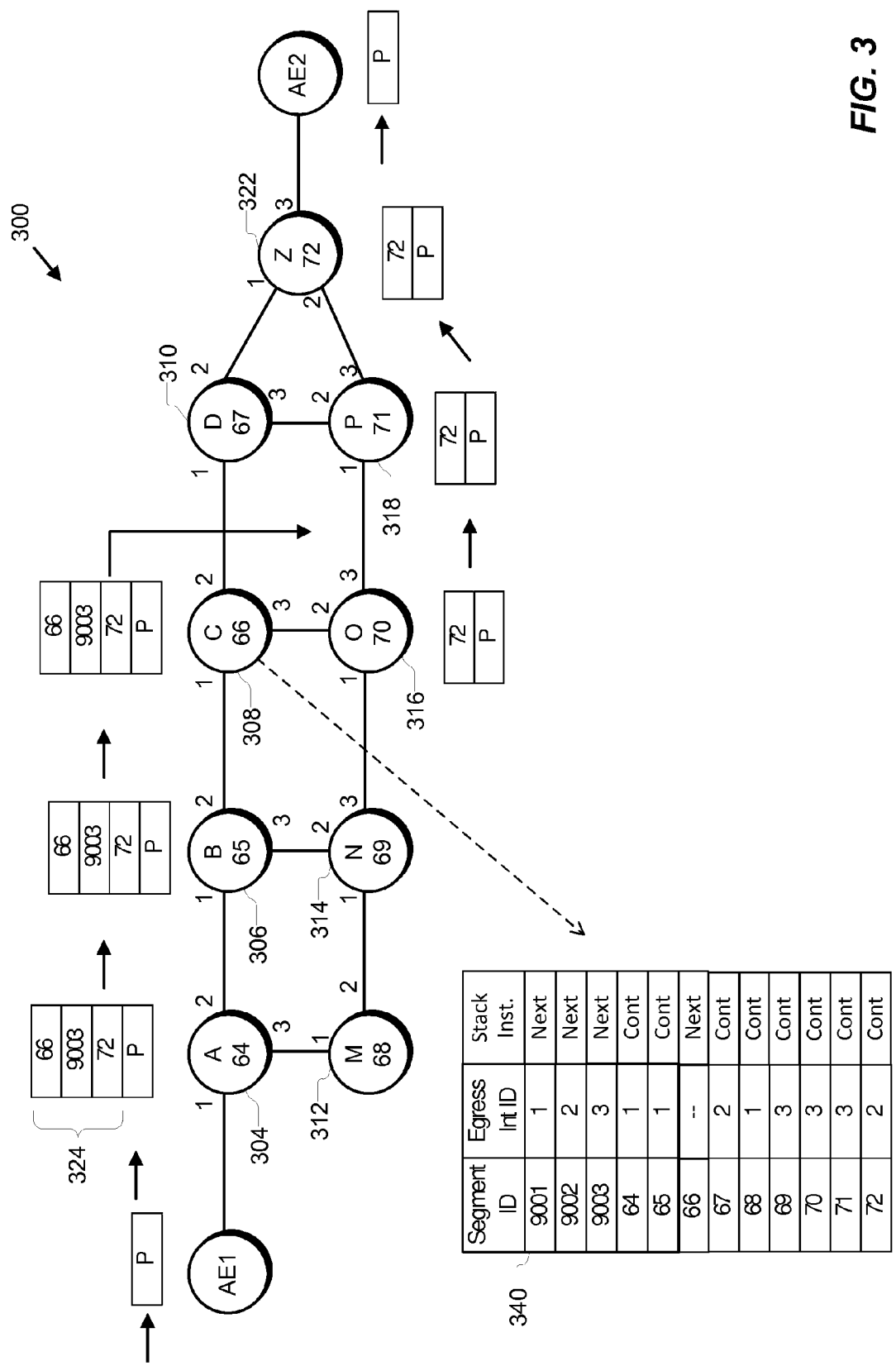
FIG. 3 is a diagram illustrating an example network, routing table, and segment identifier stack.

To illustrate general concepts of segment routing, FIG. 3 shows an example of an SR enabled provider network that is in data communication with access network nodes AE1 and AE2. In the embodiment of FIG. 3, network 300 consists of SR nodes 304-322. Nodes 304-310 are assigned unique nodal segment IDs 64-67, respectively, nodes 312-318 are assigned unique nodal segment IDs 68-71, respectively, and node 322 is assigned a unique nodal segment ID of 72. Each of the SR nodes 304-322 has interfaces that are identified as shown. For example, node 304 has three interfaces designated 1-3, respectively. Each of the nodes 304-322 is assigned a unique loopback. Loopbacks A-D are assigned to nodes 304-310, respectively, loopbacks M-P are assigned to nodes 312-318 respectively, and loopback Z is assigned to node 322. These loopbacks are unique in the network and can be used for several purposes such as calculating the topology of network 300, which in turn can be used to create segment paths and/or to calculate paths according to a routing algorithm and thus determine next hop egress interfaces for SR forwarding tables. Nodes 304-322 can also assign locally significant adjacency segment IDs. For example, node 308 can assign adjacency segment IDs 9001-9003 to links CB, CD, and CO, respectively.

Each of SR nodes 304-322 can advertise routing information to the other nodes in network 302 using an IGP with SR extensions. For example, node 308 can generate and send one or more link state advertisements that include adjacency segment IDs 9001-9003 bound to link IDs CB, CD, and CO, respectively, and nodal segment ID 66 bound to loopback C. One of ordinary skill understands that link state advertisements may contain additional information. Using the advertisements they receive, the control planes of nodes 304-322 can generate respective SR forwarding tables for use in the data planes. For example, node 308 can generate example SR forwarding table 340 that maps adjacency segment IDs 9001-9003 to node interface IDs 1-3, respectively, and nodal segment IDs such as 64, 65, 67, 70, and 72, to node 308 interfaces 1, 1, 2, 3, and 2, respectively, which are the next hop egress interfaces determined by node 308 for loopbacks A, B, D, O, and Z respectively. It is noted that in the embodiment shown, only SR forwarding table 340 maps adjacency segment IDs 9001-9003 to interfaces; SR forwarding tables in the other nodes of network 302 should not map adjacency segment IDs 9001-9003. In the embodiment of FIG. 3, SR forwarding table 340 also maps each segment ID to a stack instruction, discussed further below.

In addition to creating SR forwarding tables based on received segment ID advertisements, certain SR nodes or a centralized control plane server (not shown) can create segment ID stacks for respective segment paths. For example, ingress edge node 304 creates example segment ID stack 324 for a segment path between ingress edge node 304 and egress edge node 322. Example segment stack 324 can be created for a particular FEC (e.g., FEC F). Example stack 324 includes three segment IDs: nodal segment IDs 66 and 72 advertised by nodes 308 and 322, respectively, and adjacency segment ID 9003 advertised by node 308. Stack 324 corresponds to a segment path in which packets flow in order through nodes 304, 306, 308, 316, 318, and 322.

In response to receiving a packet from access node AE1, SR node 304 or a centralized control plane server (not shown) can select a segment ID stack based on information contained in the packet. For example, node 304 can calculate FEC F for a received packet P based on the destination IP address in packet P. As another example, FEC F can be calculated based on a UDP port number in a UDP/IP implementation. FEC F is mapped to example segment ID stack 324 in a table not shown. Node 304 adds segment ID stack 324 to packet P. Example segment ID stack 324 lists segment IDs that correspond to one-hop and multi-hop segments that packets traverse to reach egress edge node 322. The segments collectively form the segment path corresponding to segment ID stack 324. Once the segment ID stack 324 is added to packet P, ingress SR enabled node 304 may use the top segment ID in the stack to access an SR forwarding table for node 304 (not shown), similar to forwarding table 340 for node 308. In such a forwarding table, the top segment ID (in this embodiment, segment ID=66) would correspond to egress interface identifier 2, which is the next hop egress interface calculated by node 304 for reaching node 308 (which corresponds to nodal segment ID 66).

In an embodiment, an SR forwarding table such as table 340 may map each segment ID to a stack instruction in addition to an egress interface. In one such embodiment, the stack instruction mapped to a nodal segment ID other than the nodal segment ID of the node doing the forwarding is "Continue." A Continue instruction tells the forwarding node to leave the top segment ID in the segment ID stack in place when forwarding the packet to the next node along the segment path. In the embodiment of FIG. 3, SR forwarding tables in nodes 304 and 306 map top segment ID 66 to a Continue stack instruction in addition to the appropriate egress interface. As a result, nodes 304 and 306 leave top segment ID 66 in place when forwarding packet P and its attached segment ID stack along the segment path.

When the packet of FIG. 3 reaches node 308 having nodal segment ID 66, SR forwarding table 340 maps top segment ID 66 to a "Next" stack instruction. A Next instruction tells the forwarding node to remove the top segment identifier so that the next segment identifier in the stack becomes the top identifier. At node 308 in FIG. 3, nodal segment ID 66 has served its purpose of bringing the packet to its associated node and is then removed from the stack. Because node 308 is the endpoint of nodal segment ID 66, no egress interface is mapped to nodal segment ID 66 in SR forwarding table 340. Instead, the forwarding engine of node 308 looks to the next segment ID in the stack after removing segment ID 66. In the embodiment of FIG. 2, the next segment ID in the stack is adjacency segment ID 9003 associated with link CO. SR forwarding table 340 maps segment ID 9003 to egress interface 3 and to a Next stack instruction. Because an adjacency segment identifier encodes only a single link in a segment path, it does not remain active in the segment stack once the packet is forwarded across the corresponding link. Node 308 therefore does not need to retain segment ID 9003 and removes it before forwarding the packet via egress interface 3.

Although not included in the embodiment of forwarding table 340, another stack instruction used in some embodiments of an SR forwarding table is a "Push" instruction, which may also be called an "Insert" instruction. The Push instruction inserts a list of segments onto the segment stack. An SR Push operation is implemented, for example, by an ingress edge SR node such as node 304 of FIG. 3, when it adds an SR identifier stack to a packet. In certain embodiments, any type of SR-enabled node can implement Push operations.

Following removal of segment identifiers 66 and 9003 at node 308, only nodal segment ID 72 remains in the segment ID stack when the packet is received at node 316. Because nodal segment ID 72 is not assigned to nodes 316 or 318, these nodes forward the packet with its segment ID stack unchanged, according to a Continue stack instruction mapped to segment ID 72 in their respective SD forwarding tables (not shown). In the embodiment of FIG. 3, when the packet reaches node 322 having nodal segment ID 72, segment ID 72 is removed according to a Next instruction mapped to segment ID 72 in the SR forwarding table for node 322 (not shown). No further segment IDs remain in segment ID stack 324 at this point. In an embodiment, the forwarding engine of node 322 employs traditional IP routing using the destination IP address within packet P to forward the packet to access node AE2.

In the embodiment of FIG. 3, segment ID stack 324 becomes smaller as packet P is routed through network 300, because segment identifiers are removed from the stack as the corresponding portions of the segment path are completed. This removal of segment identifiers is consistent with, for example, an implementation using the MPLS data plane. In an embodiment, the SR Continue instruction is implemented in the MPLS data plane by an MPLS swap operation having the incoming label value equal to the outgoing label value. The SR Next instruction is implemented as an MPLS pop operation, and the SR Push instruction is implemented as an MPLS push operation. Such a segment routing implementation using the MPLS data plane may advantageously provide an implementation without the use of Label Distribution Protocol (LDP). In certain cases, for example, the MPLS configuration of using LDP for distribution of labels and IGP for distribution of network topology information can lead to errors because of differences in the time needed for LDP and IGP to respond to network disruptions. By using IGP for distribution of both segment identifiers and network topology information, segment routing may reduce the potential for error in the event of network disruptions.

In an alternative embodiment to that of FIG. 3, the stack of segment IDs attached to a packet remains unchanged as the packet is forwarded along the segment path. In such an embodiment, a pointer, or some other information is used to identify an active segment ID in the segment ID stack. The pointer can be advanced or incremented as the packet is forwarded along the segment path. This type of implementation may be particularly suitable, for example, to applying segment routing to an IPv6 network. In an embodiment, a segment ID stack and pointer field can be included within an IPv6 extension header. In such an embodiment, the Continue operation described above is implemented by leaving the pointer at the same segment identifier within the list, the Next operation is implemented by moving the pointer to the next segment identifier, and the Push operation is implemented by adding one or more additional segment identifiers to the segment list.

It is noted that the description above of an implementation using a pointer with a segment ID stack does not include an operation for removing segment IDs from the stack. As such, this embodiment does not lend itself to the compression methods described herein. As discussed in more detail below, some embodiments including IPv6 implementation of the compression methods described herein involve establishing an additional operation or an alternative implementation of the Next operation.

Forwarding table 340 in FIG. 3 includes a stack instruction mapped to each segment identifier, as discussed above. In an alternative embodiment, stack instructions are determined "on the fly" by a forwarding engine in each node rather than being included in SR forwarding tables. In one embodiment, a method for determining whether to retain or remove a segment identifier includes determining whether the top segment ID in the segment ID stack of a received packet is the nodal segment ID of the receiving node. If so, the nodal segment ID is removed from the stack (or in an implementation using a pointer, the pointer identifying the active segment ID is incremented). If there is no new top segment ID (i.e., the removed segment ID was at the bottom of the segment ID stack) the packet P has arrived at the egress edge node of the SR network, and further routing is done using the routing mechanism (such as IP routing) of the external network. If a new top segment ID is exposed, or if the original top segment ID does not match the nodal segment ID of the receiving node, the forwarding engine accesses the node's SR forwarding table to read the egress interface that is mapped to the top segment ID. When forwarding the packet to the mapped egress interface, the segment ID is either removed if it is an adjacency segment ID or retained if it is a nodal segment ID. In an embodiment, the forwarding engine determines whether the segment ID is an adjacency segment ID by comparing it to a designated range of adjacency segment IDs available for assignment within the network. In an alternative embodiment, the determination involves checking a routing table or segment routing database. In an alternative embodiment of stack instructions for nodal segment identifiers, the nodal segment identifier could be removed by the node immediately before the node that the nodal segment identifier is assigned to, in analogy to penultimate-hop popping of MPLS labels.

Segment Identifier Stacks

As noted in the discussion above, segment routing of data packets involves adding a stack of segment identifiers to a packet. Whether the segment identifiers are added as MPLS labels between the IP header and data link layer header of the packet, within an IPv6 extension header, or according to some other data plane implementation, the segment identifier stack ultimately increases the size of the packet being routed. Examples of segment routing scenarios that may involve particularly large label stacks include segment routing with adjacency segments, nested segment routing domains analogous to the nested MPLS domains shown in FIG. 2, and multicast transmission using segment routing.

Large stacks of segment identifiers may adversely affect network performance, particularly in portions of a network having relatively low bandwidth. For example, voice-over-IP applications may employ relatively low-bandwidth access circuits. This disclosure describes methods and devices for reducing the size of a segment identifier stack when it is advantageous to do so. In an embodiment, the method is simple, optional and independent of the application creating the segment identifier stack.

Figure 4A:
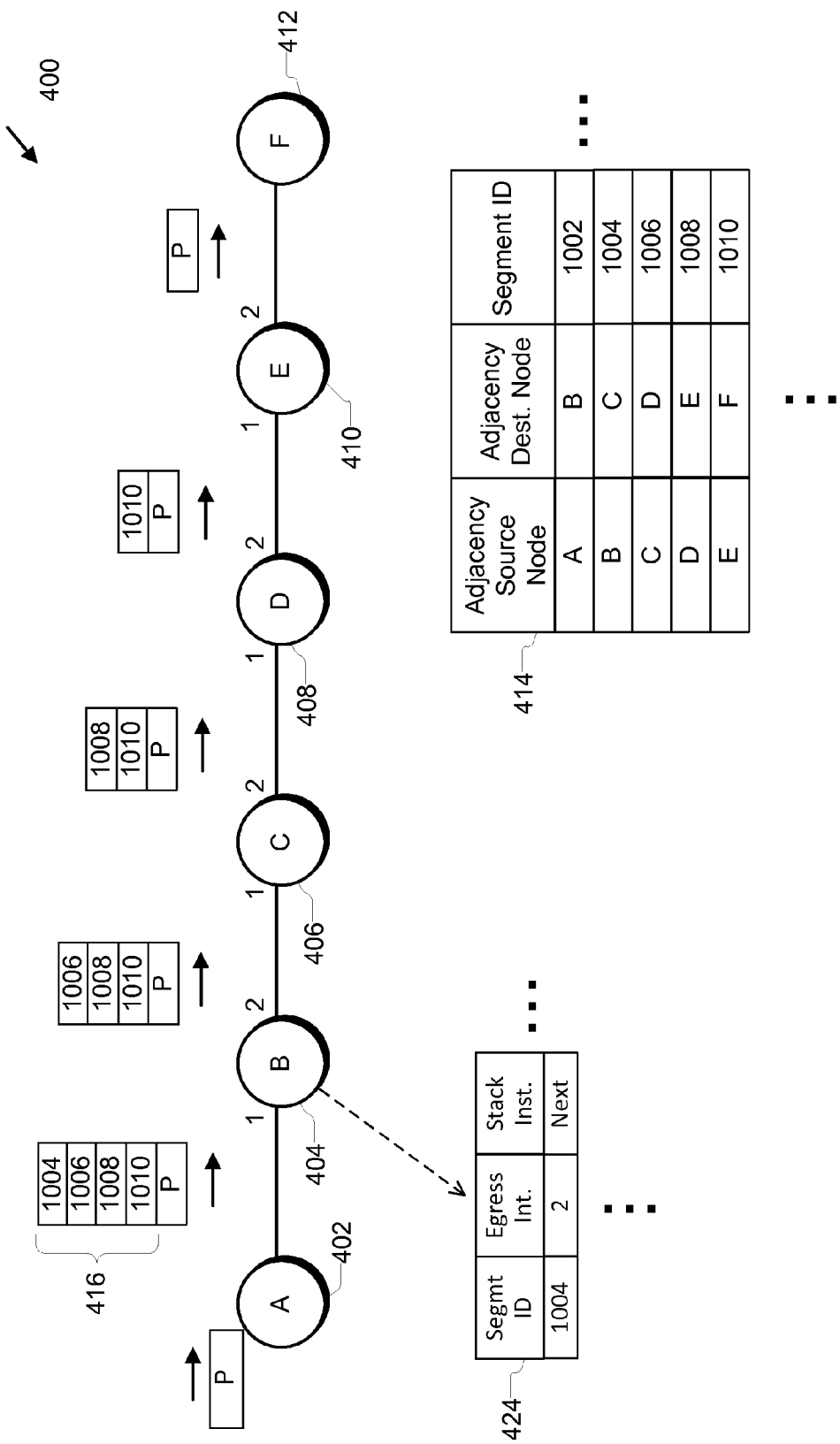
FIG. 4A is a diagram illustrating an example network, routing table, forwarding table and segment identifier stack.
Figure 4B:
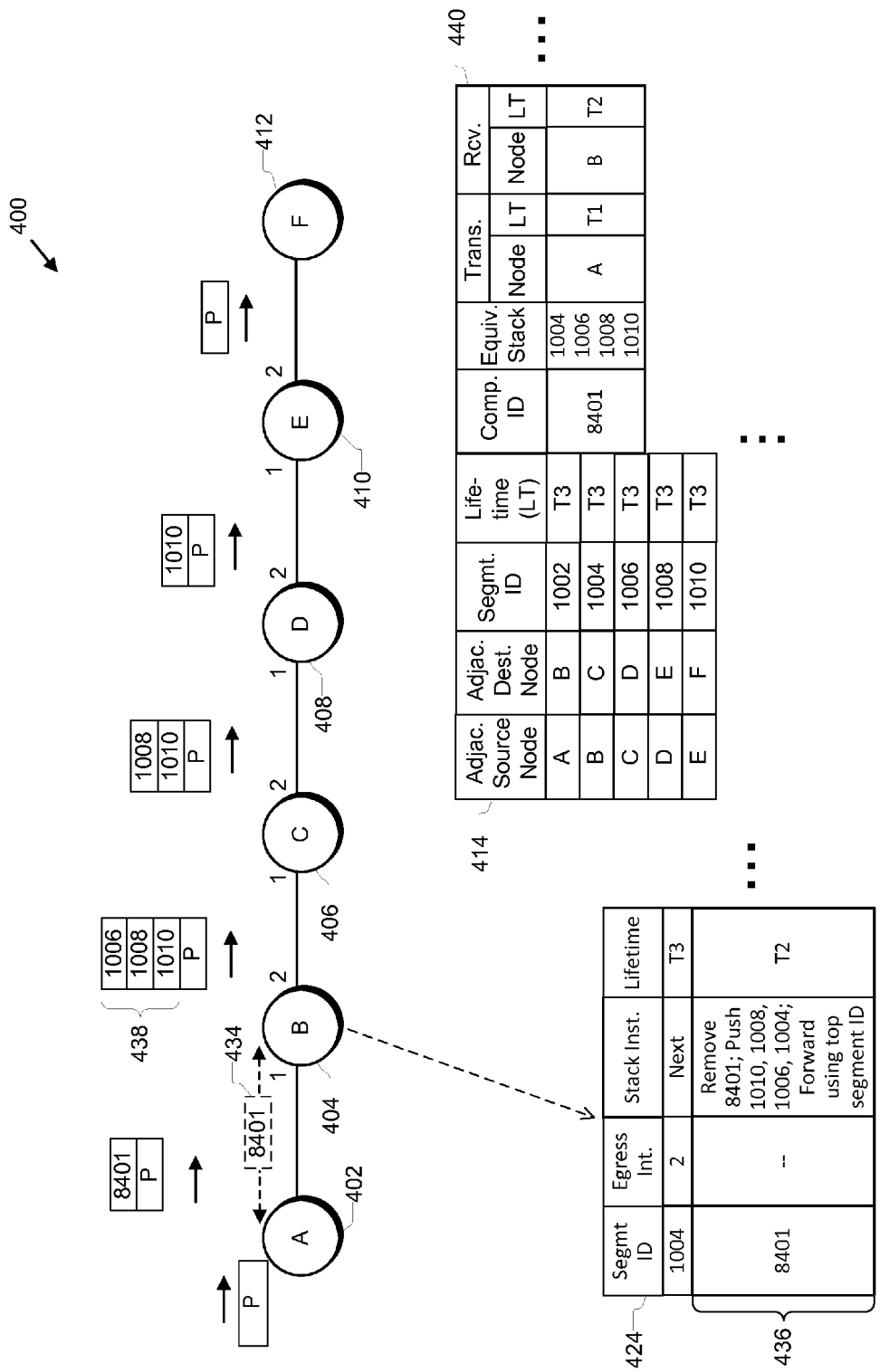
FIG. 4B is a diagram illustrating an example network employing opportunistic stack compression, with an example routing table, forwarding table and segment identifier stack.
Figure 4C:
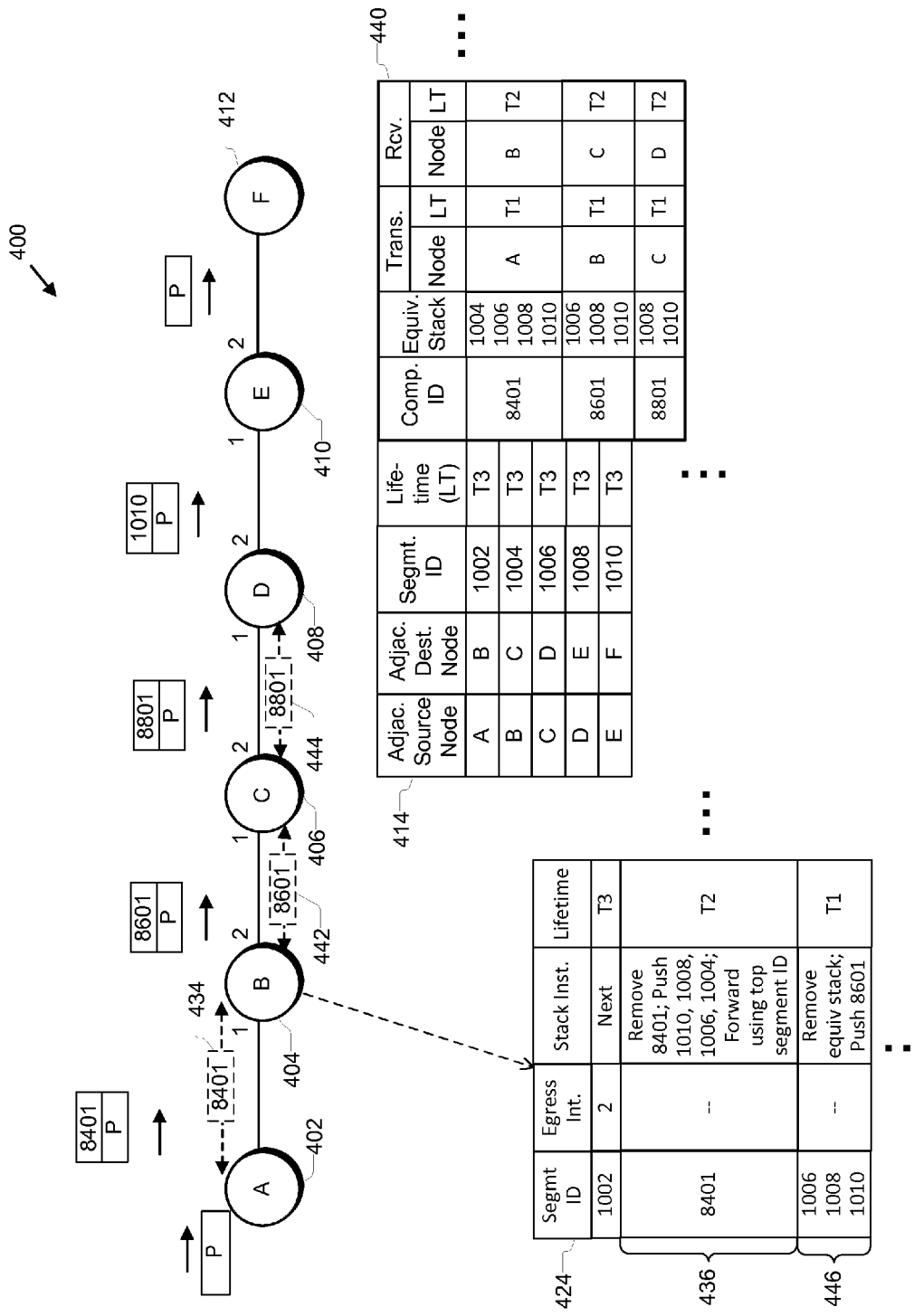
FIG. 4C is a diagram illustrating an example network employing opportunistic stack compression, with an example routing table, forwarding table and segment identifier stack.

Certain embodiments of a method for opportunistic compression are illustrated by FIGS. 4A through 4C. FIG. 4A illustrates a simplified network portion 400 configured for segment routing. Network portion 400 includes nodes 402, 404, 406, 408, 410 and 412, which are assigned unique loopbacks A-F, respectively. Node 402 is the ingress access node to SR network portion 400 from a network employing IP routing. Each of the nodes has network interfaces that are identified as shown. For example, node 404 has interfaces designated 1 and 2.

Each segment routing node may assign one or more adjacency segment IDs. Portion 414 of an SR routing table relates adjacency segment IDs to node loopbacks in network portion 400. In an embodiment, SR routing table portion 414 is generated by an SR routing engine in each of nodes 402-412 using information received in IGP advertisements sent by the other nodes in network portion 400. In an embodiment, the network nodes first receive advertisements identifying the nodes in the network and how the nodes are interconnected, and then advertise and receive advertisements of segment identifiers associated with the nodes. "SR routing table" as used herein refers to a data structure relating segment identifiers to network topology information, such as network nodes and the links between them. The routing table is created by and used by the control plane of a node. In an embodiment, the SR routing table is within a link state database formed using advertisements over IGP link state protocols having SR extensions. Depending on the data plane implementation of an SR network, an SR routing table may also be referred to as a routing information base (RIB) or label information base (LIB).

"SR forwarding table" as used herein refers to a data structure for a given node relating segment identifiers to respective egress interfaces of the node for forwarding of a packet, as in table 340 of FIG. 3. A forwarding table is created by the control plane of a node for use by the data plane. Depending on the data plane implementation of an SR network, an SR forwarding table may also be referred to as a forwarding information base (FIB) or label forwarding information base (LFIB). Each of the SR routing table and SR forwarding table may alternatively take the form of a database or some other data structure, or may be split into more than one data structure. In an embodiment, the SR forwarding table and SR routing table may be combined into a single database or other data structure at a node.

In the embodiment of FIG. 4A, SR routing table portion 414 includes an adjacency source node and an adjacency destination node for each listed adjacency segment ID. The source node and destination node reflect the direction of travel of a packet routed using the corresponding adjacency segment ID. For example, segment ID 1004 is assigned by node 404 (having loopback B) to the link between node 404 and node 406. Segment ID 1004 also appears in SR forwarding table portion 424 for node 404, mapping segment ID 1004 to egress interface 2 of node 404. Forwarding tables and routing tables may include additional information not shown in table portions 424 and 414. For example, in certain embodiments both tables include nodal segment identifiers for one or more nodes in the SR network. In addition, routing tables in some embodiments include adjacency segment identifiers for packets traveling in the opposite direction to that shown in routing table portion 414 (such as from node B to node A).

FIG. 4A illustrates segment routing through network portion 400 using adjacency segment identifiers. In response to receiving a packet P, ingress edge node 402, or another network device such as a centralized control plane server (not shown), generates segment identifier stack 416 based on information in the packet, such as its IPv4 or IPv6 destination address, and adds the segment ID stack to the packet. In an embodiment for which packet P is sent using UDP/IP, segment identifier stack may be generated based on a UDP port number. How the segment ID stack is added specifically depends upon the data plane implementation of the network. In an embodiment of an IPv6 implementation, for example, the segment ID stack is included in an extension header between the IP header and the payload of the test packet. In an MPLS implementation, the segment ID stack is instantiated as an MPLS label stack and included in a header between the data link layer header and the IP header of the test packet. Whatever the data plane implementation, the segment ID stack is added to the test message in a manner allowing the stack to be accessed by an SR forwarding engine.

In the simplified example of FIG. 4A, segment ID stack 416 uses adjacency segment identifiers to define a path for packet P through network portion 400 from node 402 to node 412. At node 404, the packet is forwarded according to the entry for uppermost segment ID 1004 in forwarding table portion 424. Specifically, segment ID 1004 is removed according to the Next stack instruction, and the packet is forwarded through egress interface 2 of node 404. Similar forwarding tables (not shown) at nodes 406, 408 and 410 result in successive removals of adjacency identifiers as the packet is forwarded from node to node, until packet P is forwarded out of network portion 400 by node 412 using IP forwarding. The methods described herein begin with segment routing of packets through an SR network in a manner such as that illustrated by, for example, FIG. 4A or FIG. 3 described above.

After packet flow using segment routing is established, modification of a segment identifier stack may occur according to the methods disclosed herein, as illustrated by the embodiment of FIG. 4B. Network 400 is the same in FIG. 4B as in FIG. 4A, except that in the embodiment of FIG. 4B an arrangement 434 exists between nodes 402 and 404. This arrangement is represented in FIG. 4B by dashed-line arrows between the two nodes, along with the compression identifier 8401.

The result of arrangement 434 is that if node 402 sends a packet to node 404 with compression identifier 8401 in the segment ID stack associated with the packet, node 404 will replace compression identifier 8401 with the stack of segment identifiers 1004, 1006, 1008, and 1010. Node 402 is not required to use compression ID 8401; it can instead send the packet with its original stack of four identifiers shown in FIG. 4A. If node 402 does use the compression ID, however, node 404 agrees to replace the compression identifier with the original four identifiers before continuing with forwarding. The result is an optional reduction of the segment identifier stack size over the link between nodes 402 and 404.

An arrangement such as arrangement 434 is initiated when one of two adjacent nodes determines that replacing a stack of segment identifiers with a single compression identifier may result in a performance improvement. In an embodiment, such a determination is made by analyzing the flow of packets traveling between the two adjacent nodes. In a further embodiment, a network flow analysis device is used in identifying segment identifier stacks for potential replacement with compression identifiers. After identifying a candidate segment identifier stack, the node makes a proposal to the adjacent node for representation of the candidate segment ID stack (also referred to herein as an "equivalent" segment ID stack) by a single compression identifier.

Figure 5A:
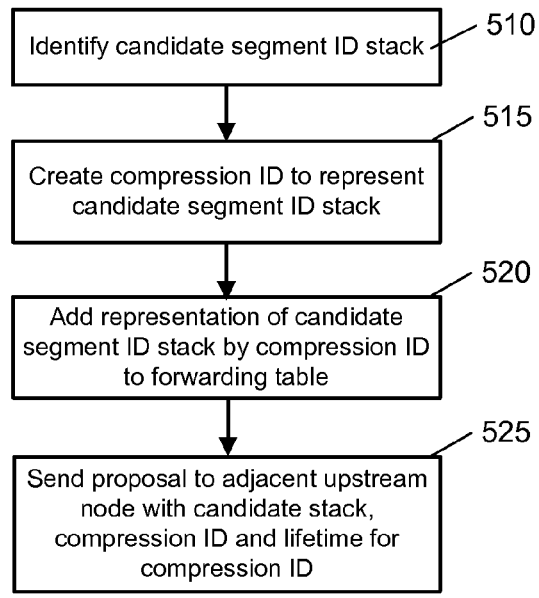
FIGS. 5A through 5C are flow charts illustrating methods of entering into an arrangement for opportunistic stack compression between adjacent network nodes.
Figure 5B:
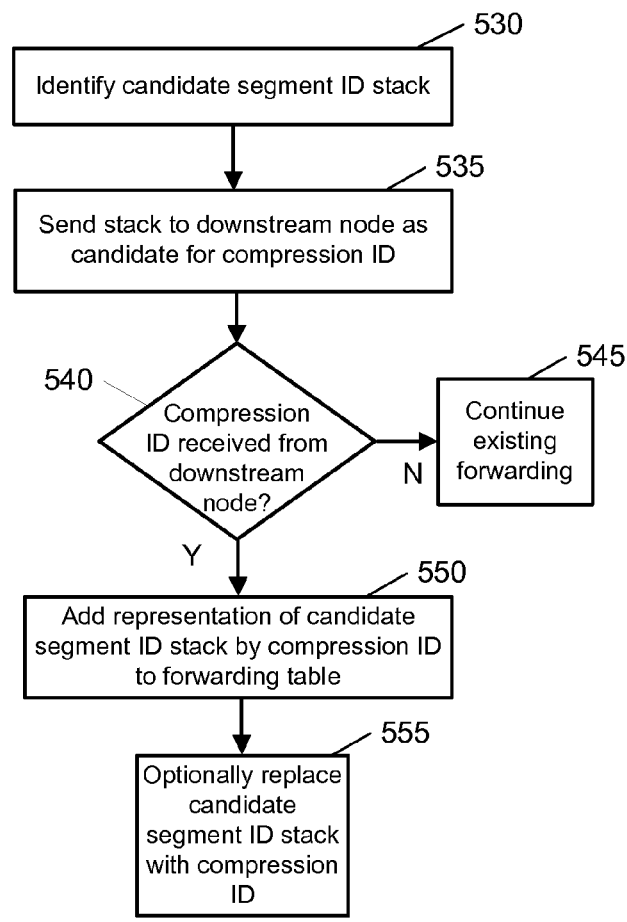
Figures 5C, 6:
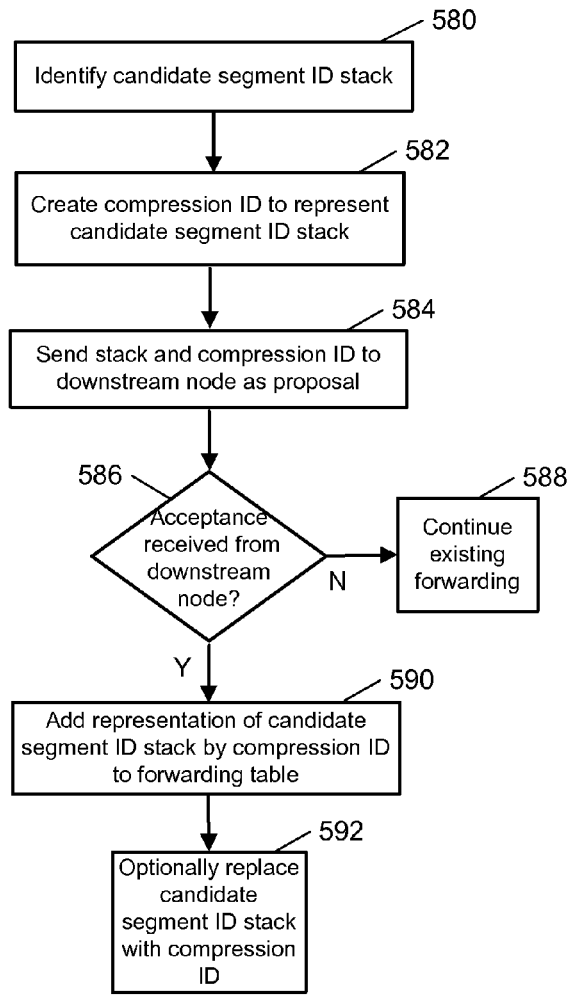
FIG. 6 is a table illustrating exemplary information relating to packet flows in a network.

Examples of processes for entering into an arrangement between adjacent nodes are illustrated by the flowcharts of FIGS. 5A through 5C. In the embodiment of FIG. 5A, the decision to propose a candidate segment identifier stack is made by the node receiving packet flow, or the "downstream" node, which makes a proposal to the node sending the packet flow (the "upstream" node). The method of FIG. 5A may be referred to herein as a receiver-proposed (RXP) method. For the example of arrangement 434 in FIG. 4B, the receiving node corresponds to node 404 of network 400. The process starts with identification by the receiving node of a candidate segment ID stack for compression (step 510). The candidate segment ID stack is a stack of segment identifiers included within packets the receiving node has been receiving from an adjacent node. In an embodiment, the receiving node uses the history of segment identifier stacks received from the adjacent node to identify segment identifier stacks for which compression may be most beneficial to the network.

In an embodiment, the history of segment identifier stacks received is organized in terms of packet flows, where a flow as used herein is a stream of one or more packets traveling between a particular source and a particular destination having a set of common properties. In a further embodiment, flows are defined, characterized and analyzed using network flow protocols such as NetFlow, developed by Cisco Systems, Inc., and Internet Protocol Flow Information Export (IPFIX), specified by the Internet Engineering Task Force (IETF), and applications based on such protocols. Information relating to packet flows may be stored at a node or at a separate network device such as a network controller or network data analyzer. Such flow data and analysis information may also be distributed across multiple network devices.

An example of network flow data that may be used in identifying a candidate segment identifier stack is shown in FIG. 6. In the embodiment of FIG. 6, flows are defined using the segment identifiers at four positions in each packet's segment identifier stack. In a further embodiment, the four positions are the top four positions in the stack. The four flows shown in exemplary flow table 600 of FIG. 6 are designated using the letters A, B, C, and D. In this example, the segment identifiers 612 are denoted with simple codes beginning with "N" for a nodal segment identifier and "A" for an adjacency segment identifier. For example, flow A is defined as including packets following a path including a nodal segment to a node 2 in the relevant network, then a nodal segment to node 5, then an adjacency segment between nodes 5 and 6, and then a nodal segment to node 20. Flow C is defined as including packets following a different path including a nodal segment to node 3, then a nodal segment to node 9, then an adjacency segment between nodes 9 and 12, followed by a nodal segment to node 20. In an embodiment, flow collection logic at the node collects data defining the flow associated with incoming packets, or at least a sampling of the incoming packets. In a further embodiment, such flow-related data is periodically sent to a separate flow collection device or server within the network, to limit the amount of data that must be stored at the node.

In addition to segment identifiers defining flows, FIG. 6 includes rankings of the flows. In the embodiment of FIG. 6, flow rankings 614 include a ranking based on volume of packets in the flow, and one based on a performance parameter associated with the flow. A performance parameter as used herein may also be referred to as a quality-of-service parameter. Flows may be evaluated based on any measurable performance parameter, such as time for packets to traverse a particular path (latency), bit error rate, or changes in such a quantity. In an embodiment, flow rankings 614 may be determined by a flow analysis engine separate from the node at which the flows are collected and communicated to the node using a network flow protocol such as those noted above. In the embodiment of FIG. 6, a lower number for a ranking indicates a higher potential impact from a reduction in packet size. For example, flow A is indicated as having the highest packet volume in table 600, with a volume rank of 1. The relatively higher volume of packets in flow A may result in a greater impact on the network from a reduction in the number of segment identifiers carried by flow A packets than from compression of the segment ID stacks of lower-volume flows. In the case of the performance-based ranking, the "1" rank of flow B indicates that this flow exhibits relatively lower performance, suggesting that a reduction in the size of the flow B packets may provide a more significant network improvement than in the case of flows exhibiting relatively higher performance.

Returning to FIG. 5A and its process for entering an arrangement with an adjacent node, the receiving node can use flow information similar to that in FIG. 6 to identify suitable segment identifier stacks for possible compression. In an embodiment, evaluation of flow information to identify candidate segment identifier stacks is done at regular intervals. Alternatively, evaluation may be performed essentially continuously, or an evaluation may be performed when the node receives an indication of a change in the topography or performance of the network. Some or all of these approaches may be combined in some embodiments. The methods of FIG. 5 are directed toward entering an arrangement regarding a single identifier stack, but a node can of course enter such arrangements for multiple segment identifier stacks. In an embodiment, a node may receive a ranking of flows by packet volume and send a proposal to its adjacent node for the label stacks corresponding to each of the top 20 or so flows (or any other suitable number in view of, for example, factors such as the size of the network or available computation and storage resources at the node). In another embodiment, a node may make a proposal to an adjacent node for label stacks corresponding to all flows between the two nodes. In an embodiment for which proposals are made for all flows, the proposing node does not need to receive rankings of flows from a network flow analysis engine before making proposals.

In addition to identifying a candidate segment identifier stack in step 510, the receiving node creates a unique compression ID to represent the candidate segment ID stack (step 515). In an embodiment for which the SR network is implemented using an MPLS data plane, the compression identifier is requested from the node's MPLS label manager. In an alternative embodiment not using the MPLS data plane, a hash of the segment IDs in the equivalent stack may be used for the compression ID. In certain embodiments, a specific numerical range is reserved for compression identifiers. In such an embodiment, the range reserved for compression identifiers is different than ranges reserved for segment identifiers such as adjacency segment identifiers or nodal segment identifiers.

When the compression ID and its equivalent identifier stack have been determined, the representation of the identifier stack by the compression ID is added to the receiving node's forwarding table (step 520). An example of such a forwarding table addition is entry 436 of forwarding table portion 424 in FIG. 4B, discussed further below. In some embodiments, the correspondence between the compression identifier and the equivalent segment identifier stack is also added to a routing table for the node.

The receiving node sends a proposal to the adjacent transmitting node that the segment identifier stack including the list of segment IDs sent with the proposal may be replaced by the transmitting node with the compression identifier also sent with the proposal (step 525). In an embodiment, the proposal also includes a lifetime for the compression identifier, i.e. a time for which the offer by the receiver to replace the compression identifier with the equivalent segment ID stack is valid. The proposal is sent from the receiving node to the transmitting node using a protocol capable of sending messages between adjacent nodes. Because replacement of the equivalent segment ID stack with the compression identifier is optional, the protocol used does not need to be a reliable protocol. A reliable protocol as used herein is a protocol that provides notification to the sender of delivery of the transmitted data. In an embodiment implementing the SR network using an MPLS data plane, proposals may be sent using the MPLS Generic Associated Channel Advertisement Protocol described in "MPLS Generic Associated Channel (G-Ach) Advertisement Protocol," by D. Frost, S. Bryant, and M. Bocci, RFC 7212, June 2014, available at https://datatracker.ietf.org/doc/rfc7212/, which document is incorporated by reference as if fully set forth herein. Other protocols suitable for this or other embodiments will also be recognized by those of ordinary skill in the art in view of the teachings of this disclosure.

In the RXP method of FIG. 5A, the receiving node does not need to receive an answer from the transmitting node to its proposal. As long as the lifetime of the compression identifier has not expired, the transmitting node may invoke the arrangement by sending a packet to the receiving node with the compression identifier associated with the packet instead of the equivalent segment identifier stack. The receiving node continues to route incoming packets using its forwarding table in the manner discussed in connection with FIG. 3 above. Within this process, the receiving node will look up the identifier at the top of the stack in its forwarding table, whether the identifier turns out to be the compression identifier or a segment identifier.

An alternative method of entering into an arrangement between adjacent nodes is illustrated by the flow chart of FIG. 5B. In the embodiment of FIG. 5B, the decision to propose a candidate segment identifier stack is made by the node transmitting the packet flow. The embodiment of FIG. 5B may be referred to herein as a transmitter-proposed (TXP) method. For the example of arrangement 434 in FIG. 4B, the transmitting node corresponds to node 402 of network 400. The process in FIG. 5B starts in the same way as the RXP method in FIG. 5A: by identifying a candidate segment ID stack for replacement with a compression ID (step 530). In an embodiment, the segment ID stack is identified using analysis of packets transmitted to the receiving node, in a manner similar to that described above for step 510 of FIG. 5A. In an alternate embodiment, particularly if the transmitting node is an edge node like node 402 of FIG. 4B, a candidate segment identifier stack may be chosen through policy, based on, for example, a source or destination IP address of an incoming packet. In an embodiment using UDP/IP, such a policy may also be based on a UDP port number.

The method of FIG. 5B continues with the transmitting node sending the identified candidate segment identifier stack to the receiving node as a candidate for replacement with a compression identifier (step 535). In the embodiment of FIG. 5B, the proposal from the transmitting node to the receiving node is essentially a suggestion for the receiving node to send to the transmitting node a compression ID that can be used by the transmitting node to represent the segment ID stack. The proposal is sent to the receiving node using the types of protocols described above for the RXP process of FIG. 5A. In the embodiment of FIG. 5B, the candidate segment ID stack is not added to the forwarding table of the transmitting node unless and until the receiving node returns a compression ID to the transmitting node, thereby agreeing to replace the compression ID with the equivalent segment ID stack in the event the transmitting node uses the compression ID. If the receiving node does not return a compression ID, the transmitting node does not change its forwarding table, and continues its existing forwarding process using segment identifiers (steps 540, 545). If the transmitting node does receive a compression ID from the receiving node, it adds the representation of the identifier stack by the compression ID to its forwarding table (step 550).

When it has been added to the forwarding table at the transmitting node, the compression ID is available for use in compressing a segment identifier stack by replacing the equivalent segment ID stack with the compression ID (step 555). It is noted that use of the compression ID is optional for the transmitting node, even after the compression ID is added to the forwarding table for the node. The transmitting node always has the option to forward a packet with an uncompressed segment ID stack. In an embodiment, the transmitting node considers a perceived benefit to the network at that time from the compression in making a decision as to whether to use the compression identifier. In another embodiment, the transmitting node considers its available resources at that time in making the decision. In a further embodiment, the transmitting node considers both of these factors in deciding whether to use the compression identifier for a given packet or group of packets.

By contrast to the optional participation by the transmitting node described above, a receiving node entering into an arrangement with a transmitting node does represent that it will replace a compression ID associated with a received packet with the equivalent segment identifier stack. Although the receiving node can decline to enter into a transmitter-proposed arrangement (for example, by not returning a compression identifier in step 540 of FIG. 5B), it should not decline to participate in an arrangement that it has entered into. If the receiving node does not replace a compression identifier in a received packet with the equivalent segment identifier stack, forwarding of that packet will not continue absent some kind of retry or recovery procedure.

In the embodiment of FIG. 5B, the transmitting node proposes a segment ID stack for compression, but does not propose the compression identifier, instead suggesting that the downstream receiving node assign a compression identifier. This approach is analogous to, for example, the convention of downstream-assigned labels in MPLS networks. In an alternative TXP embodiment shown in FIG. 5C, the method is similar to that of FIG. 5B, except that in the embodiment of FIG. 5C the transmitting node creates a unique compression ID to represent the candidate segment ID stack (step 582), and proposes to the receiving node that the compression ID be used to represent the segment ID stack (step 584). If the receiving node sends an acceptance of the proposal, the transmitting node can use the compression ID in a manner similar to that described for FIG. 5B (steps 586-592). In an embodiment for which the SR network is implemented using an MPLS data plane, the upstream assignment of the compression ID is carried out in accordance with MPLS requirements for upstream assignment of labels, as described in "MPLS Upstream Label Assignment and Context-Specific Label Space," by R. Aggarwal et al., August 2008, available at http://tools.ietf.org/html/rfc5331, which document is hereby incorporated by reference as if fully set forth herein.

Turning back to FIG. 4B, arrangement 434 between nodes 402 and 404 of network 400 is entered into through a method such as those discussed above in connection with FIGS. 5A through 5C. In the embodiment of FIG. 4B, the process of entering into the arrangement has progressed to the point that the compression identifier and its equivalent segment ID stack have passed between nodes 402 and 404 (in one direction or the other, depending on whether the arrangement was entered into by a TXP or RXP method), as well as a lifetime for the compression label. The correspondence between the compression identifier and its equivalent segment ID stack has also been added to forwarding tables for both nodes. This situation corresponds, for example, to reaching at least step 525 in the method of FIG. 5A, at least step 550 in the method of FIG. 5B, or at least step 590 in the method of FIG. 5C.

In the embodiment of FIG. 4B, forwarding table portion 424 includes entry 436 added as a result of arrangement 434. Compression identifier 8401 is entered in the segment identifier column of table portion 424. The correspondence between compression ID 8401 and its equivalent segment ID stack is contained in the stack instruction associated with compression ID 8401. The stack instruction for entry 436 is to remove the compression identifier 8401, then to push the segment identifiers 1010, 1008, 1006 and 1004 onto the segment identifier stack, then to forward the packet using the top segment identifier. In this embodiment, the segment identifiers are listed in the order they would be pushed onto the stack one at a time, so that the resulting segment identifier stack has ID 1010 at the bottom and 1004 at the top. The forwarding table entry for top identifier 1004 is then used in forwarding the packet. The entry for 1004 includes a Next stack instruction, so that ID 1004 is removed from the stack before it is forwarded over egress interface 2 of node 404. It is noted that in an alternative embodiment for which the top segment identifier in the stack is a nodal segment identifier for a node farther along the path of network 400, the stack instruction for the top segment is a Continue instruction such that the top segment ID is left on the stack.

The effect of the stack instructions carried out by node 404 in the embodiment of FIG. 4B can be seen in the representations of the packets traveling between nodes of network 400. Packet P is sent from node 402 to node 404 having compression identifier 8401 added to it instead of equivalent segment identifier stack 416 shown in FIG. 4A Implementing the stack instruction associated with compression ID 8401, node 404 removes the compression ID, replaces the compression ID with the original segment ID stack, then removes the top segment ID 1004 pursuant to the forwarding table entry for that segment ID. The result is that node 404 forwards packet P with segment stack 438.

As mentioned above in the discussion of FIG. 3, an instruction to remove an identifier from a segment identifier stack is inconsistent with the above-described embodiment applying segment routing to an IPv6 data plane by using a pointer to indicate the active segment in a segment identifier list. For an MPLS data plane, the instruction in entry 436 of FIG. 4B to remove compression identifier 8401 can be implemented using a segment routing Next operation, which becomes an MPLS pop operation. In the IPv6 implementation using a pointer, however, a segment routing Next operation would simply move the pointer away from compression identifier 8401 while leaving it in a segment identifier list within an IPv6 extension header. In one alternative embodiment of an IPv6 implementation of segment routing, the segment routing Next operation is implemented not through movement of a pointer, but by actual removal of the corresponding identifier from the identifier list within the extension header. Such an embodiment may require recalculation and updating of an extension header length field each time an identifier is removed from the segment identifier list.

In another alternative embodiment of an IPv6 implementation of segment routing, the segment routing Next operation is implemented through movement of a pointer as described in the discussion of FIG. 3 above, and an additional segment routing operation is implemented to remove segment identifiers from a segment list for stack compression purposes. One embodiment of such an additional segment routing operation is a Remove operation. In an MPLS data plane implementation, the Remove operation is implemented as a pop operation, in the same way as a SR Next operation. In an IPv6 implementation, the Remove operation is implemented differently than the Next operation because the Remove operation actually removes the corresponding identifier from a segment identifier list in an IPv6 extension header (or alternatively removes the extension header and replaces it with a new extension header having the revised segment list). Another embodiment of an additional segment routing operation is a Replace operation in which one or more identifiers are removed from a segment stack and a different one or more identifiers are inserted in the place of those removed. In an embodiment of an MPLS data plane implementation, the Replace operation is implemented as a pop operation for removal followed by a push operation for replacement. In an embodiment of an IPv6 data plane implementation, the Replace operation is implemented by removing designated identifiers from a segment identifier list in an extension header and replacing the removed identifier(s) with additional segment identifiers.

In the embodiment of FIG. 4B, information relating to compression IDs is stored in routing table portion 414 as well as forwarding table portion 414. Compression ID section 440 of routing table 414 includes the compression ID and its equivalent stack of segment IDs, as well as loopbacks identifying the transmitting node and receiving node associated with the compression ID. In the embodiment of FIG. 4B, a lifetime T1 is associated with compression ID 8401 at the transmitting node, while a lifetime T2 is associated with that compression ID at the receiving node. In this embodiment, lifetime T2 is included in the entry for compression ID 8401 in forwarding table 424 for receiving node 404, while lifetime T1 is included in an entry for the same compression ID in a forwarding table for transmitting node 402 (not shown). In an embodiment, T2 is longer than T1 to ensure that the receiving node is able to forward a packet sent using the compression ID. The lifetime is the time that the compression ID is valid at the corresponding node if not renewed by the node assigning the compression ID.

In addition to compression ID 8401, adjacency segment identifiers 1002 through 1010 are also associated with a lifetime in the embodiment of FIG. 4B. In an alternative embodiment, segment identifiers are removed from routing and forwarding tables when necessary through network updates or advertisements, and are not associated with lifetimes. In an embodiment illustrated by FIG. 4B, lifetime T3 for segment identifiers is longer than lifetimes T1 and T2 for compression identifiers. In a further exemplary embodiment, lifetimes T1 and T2 are in the general range of seconds to minutes, while lifetime T3 is in the general range of hours to days. Alternative or additional ways of managing the validity of compression identifiers or segment identifiers, including caching of the identifiers, will be recognized by those of ordinary skill in the art in view of the teachings of this disclosure.

As explained above, FIG. 4B illustrates a situation in which the size of the segment identifier stack within a packet transmitted from node 402 to node 404 is decreased through the use of a compression identifier. Forwarding between the remaining nodes of network 400 continues to employ the original segment identifier stacks. A different situation including additional arrangements between other pairs of nodes in network 400 is shown in FIG. 4C. In one embodiment of packet flow through network 400, the situation of FIG. 4C arises over time from the situation of FIG. 4B, with continued packet flow through network 400.

In the embodiment of FIG. 4C, arrangement 442 between nodes 404 and 406 and arrangement 444 between nodes 406 and 408 are entered into in the manner described above for arrangement 434. As a result, compression ID section 440 of routing table portion 414 includes additional entries relating compression identifiers 8601 and 8801 to their respective equivalent segment ID stacks, transmitting nodes, and receiving nodes. In this embodiment, each compression ID is associated with a lifetime T1 at its transmitting node and a lifetime T2 at its receiving node, as discussed further for compression ID 8601 in the description of FIG. 4B above.

Routing table portion 424 for node 404 includes an entry 446 relating to transmitted compression ID 8601 as well as entry 436 relating to received compression ID 8401. A separate routing table for node 406 (not shown) includes an entry related to receiving of compression ID 8601. This entry for compression ID 8601 in the node 406 routing table has a form similar to that of entry 436 in table 424, since entry 436 also relates to a received compression ID. In the embodiment of FIG. 4C, the entry for compression ID 8601 in the node 406 routing table includes a lifetime T2 associated with the compression ID, while entry 446 includes a lifetime T1 for the same compression ID. In an embodiment, T2 is larger than T1 to help ensure that a transmitted compression ID is recognized at the receiving node.

In entry 446 of table portion 424, the equivalent segment ID stack including segment IDs 1006, 1008 and 1010 appears in the segment ID column. The stack instruction for this equivalent segment ID stack is to remove the stack and replace it with compression ID 8601. For an implementation using the MPLS data plane, this stack instruction can be implemented by segment routing Next operations, which become MPLS pop operations, on the segment IDs in the equivalent stack, followed by a segment routing (and MPLS) Push of the compression identifier.

As explained above in the discussion of entry 436, use of an SR Next operation in an IPv6 implementation using a pointer would not result in actual removal the segment identifiers (nor in reduction of the size of the packet). In an alternative embodiment of an IPv6 implementation of the stack instruction in entry 446, the equivalent segment ID stack is removed using an SR Remove operation implemented such that the corresponding segment identifiers are actually removed from the segment ID list in an IPv6 extension header attached to the packet. In another alternative embodiment of an IPv6 implementation, the equivalent segment ID stack is removed using an SR Replace operation. In some IPv6 implementations, the compression identifier is pushed or inserted by writing the compression ID to the destination address field in the IPv6 header of the packet. In other embodiments, the compression identifier is written to a UDP port field in a UDP/IP implementation. In a further embodiment, the compression identifier is written to a UDP source port field.

Entry 446 relating to compression ID 8601 at node 404 does not include an egress interface associated with the compression ID. Although the egress interface for transmission of compression ID 8601 can be determined since the transmitting and receiving nodes are known, the method of FIG. 4C sends the forwarding engine to the entry for the top segment identifier on the arriving segment identifier stack to find the egress interface. In this way, the stack instruction associated with top segment identifier is also implemented (such as a Next instruction for an adjacency segment or a Continue instruction for a pending nodal segment).

The method of forwarding by a node such as node 404 in FIG. 4C effectively decompresses an incoming compressed segment ID stack in order to retrieve the egress interface and stack instruction for the segment ID at the top of the stack. After executing any stack instruction for the top segment ID, the node optionally recompresses the stack using any outgoing compression IDs, then forwards the packet through the retrieved egress interface. In an embodiment, the time and resources associated with this processing is a consideration when a node decides whether to perform optional stack compression or to enter into an arrangement allowing for stack compression.

Figure 7:
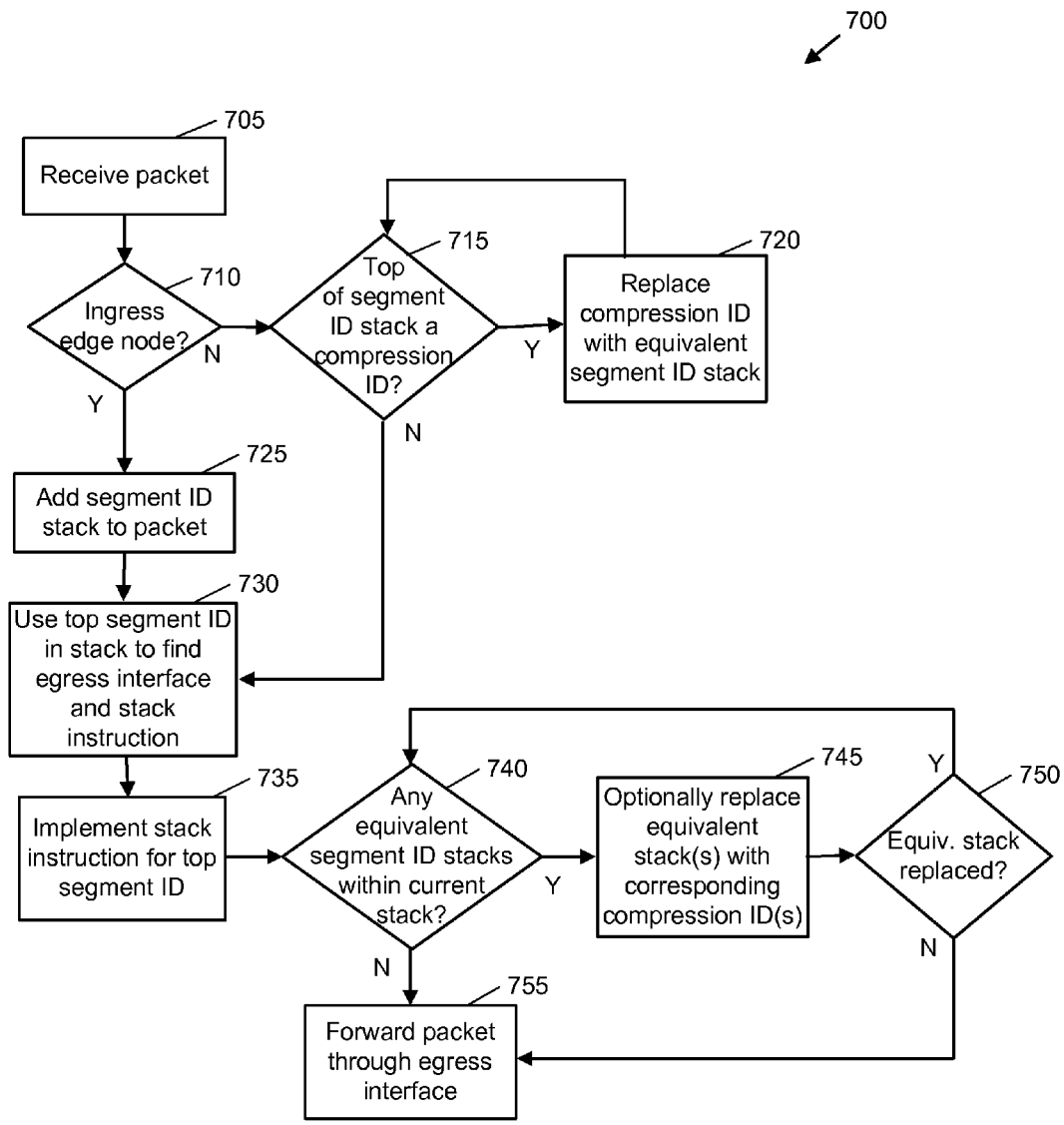
FIG. 7 is a flow chart illustrating a method of packet forwarding providing for opportunistic segment identifier stack compression.

An embodiment of a forwarding process 700 employing opportunistic stack compression is illustrated in the flowchart of FIG. 7. If the node performing the process is an ingress edge node, the node adds the appropriate segment identifier stack to a received packet (steps 705, 710, 725). If the node is not an ingress edge node, it determines whether the identifier at the top of the segment identifier stack attached to the node is a compression identifier (steps 705, 710, 715). In an embodiment, this determination is made based on the form of a forwarding table or routing table entry, or on the contents of a field in one of these tables. In another embodiment, determining whether the identifier at the top of the stack is a compression identifier includes comparing a numerical range of the identifier at the top of the stack to a designated range for compression identifiers. The determination includes making sure the compression ID is not expired, unless the compression IDs are managed in such a way that they cannot be accessed once they expire. If the top segment identifier is a valid compression identifier, the node replaces the compression identifier with its equivalent segment ID stack (steps 715, 720). In an embodiment, this replacement is pursuant to a forwarding table entry such as entry 436 of FIGS. 4B and 4C.

Figure 8:
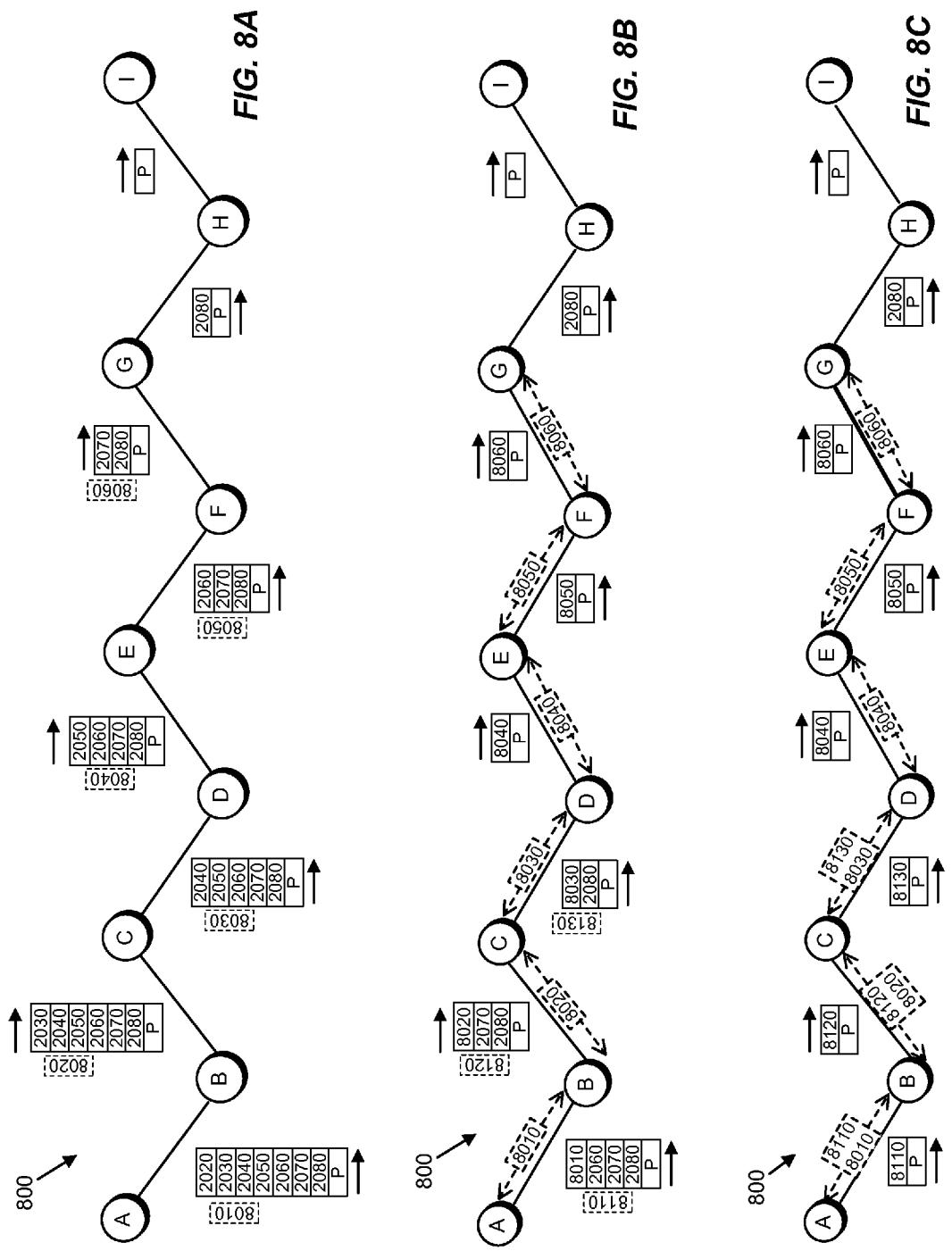
FIGS. 8A through 8C are diagrams illustrating an example network and exemplary segment identifier stacks included in packets routed through the network.

After a compression identifier at the top of the segment ID stack is replaced with its equivalent segment ID stack, a new identifier is at the top of the segment ID stack. The method of FIG. 7 returns to step 715 to determine whether the new top identifier on the stack is a compression identifier. The new top identifier is a compression ID in an embodiment for which one compression ID is incorporated into the equivalent label stack for a second compression ID. This situation is discussed further below in connection with FIG. 8. The loop through steps 715 and 720 implements a decompression of the incoming segment identifier stack to the extent it has been compressed, so that the top segment identifier of the uncompressed segment ID stack may be accessed. This top segment identifier is then used to access the forwarding table for the node (step 730). Because an ingress edge node does not receive an incoming segment ID stack, there is no incoming compression ID for the ingress edge node to look for. After adding a segment ID stack to the packet, the ingress edge node also continues to step 730.

In step 730 of method 700, the egress interface and stack instruction corresponding to the top segment ID of the uncompressed segment ID stack are obtained. In an embodiment, this is done through a lookup in a forwarding table such as table 424 of FIGS. 4A-4C. The node, or its forwarding engine, then implements the stack instruction for the top segment ID (step 735). In an embodiment for which the top segment ID is an adjacency segment identifier, the stack instruction is a segment routing Next instruction. In an alternative embodiment for which the top segment ID is a nodal segment ID for a node further along the segment path, the stack instruction implemented is a segment routing Continue instruction.

When the stack instruction for the top segment ID has been implemented, the packet is ready for forwarding using the egress interface looked up in step 730. The node may choose to first compress the segment ID stack, however, if any portion of the segment ID stack attached to the packet is subject to an arrangement with the downstream node for representation by a compression ID. In step 740 the node determines whether there are any equivalent segment ID stacks (stacks associated with a compression ID) within the current segment ID stack. In an embodiment, this is determined by one or more lookups in a forwarding table or routing table. If the current segment ID stack contains an equivalent segment ID stack associated with an unexpired compression ID, the node may optionally replace the equivalent segment ID stack with its corresponding compression ID (steps 740, 745). In an embodiment, this replacement is pursuant to a forwarding table entry such as entry 446 of FIG. 4C.

If an equivalent segment ID stack is replaced with its corresponding compression ID (step 750), the method of FIG. 7 returns to step 740 to determine whether the compression ID is part of an equivalent segment ID stack corresponding to another compression ID. An embodiment illustrating this situation is discussed further below in connection with FIG. 8. When there are no equivalent segment ID stacks for compression or when the node has declined to replace an equivalent stack with its compression ID, the packet is forwarded through the egress interface obtained in step 730 (step 755). The loop through steps 740, 745 and 750 implements an optional compression of the segment identifier stack of an outgoing packet by the transmitting node.

Turning back to FIG. 4C, the result of applying the method of FIG. 7 to network 400 of FIG. 4C is illustrated by the diagrams representing segment ID stacks transmitted between each pair of nodes. For the packet illustrated in FIG. 4C, each node with an option to replace a segment identifier stack with a compression ID does so. Node 402 replaces the segment ID stack of the packet with compression ID 8401 before forwarding the packet to node 404. Node 404 decompresses the segment ID stack in keeping with its arrangement with node 402, then applies the stack instruction corresponding to the uppermost segment ID on the uncompressed segment ID stack (adjacency segment 1004). After removing adjacency segment 1004 pursuant to the stack instruction, node 404 compresses the remaining segment ID stack using compression ID 8601 before forwarding the packet to node 406. Node 406 then decompresses the segment ID stack by replacing compression ID 8601 with its equivalent segment ID stack, and applies the stack instruction corresponding to the uppermost segment ID. After removing adjacency segment 1006 pursuant to the stack instruction, node 406 compresses the remaining segment ID stack using compression ID 8801 before forwarding the packet to node 408. Decompression and removal of the uppermost adjacency segment by node 408 brings the stack down to the last adjacency segment 1010.

The series of segment ID stacks in FIG. 4C resembles label stacks resulting from MPLS label swapping. For an embodiment of SR implemented using an MPLS data plane in network 400, the packet illustrated in FIG. 4C is forwarded using MPLS label swapping along an LSP corresponding to network portion 400.

Network portion 400 is an extremely simple network example used herein for clarity of explanation. A larger, more complex network having larger segment identifier stacks is expected to provide greater opportunity for network performance improvement through compression of segment identifier stacks. In one embodiment, operation of the segment identifier stack compression methods described herein in a network in which packets have larger segment identifier stacks is as illustrated by FIG. 4C, but with larger equivalent segment identifier stacks for each compression ID. In such an embodiment, these larger stacks would be seen in a forwarding table and routing table such as forwarding table portion 424 and routing table portion 414 of FIG. 4C.

In an alternative embodiment, however, the size of an equivalent segment ID stack that can be identified as a suitable candidate stack for compression is limited by the number of segment identifiers that can be monitored by packet flow collectors. In such an embodiment, equivalent stack sizes may be limited because the stack sizes that can be used to define network flows for analysis are limited. FIGS. 8A through 8C illustrate operation of the method of FIG. 7 in an embodiment of a network with packets having larger segment identifier stacks. In the embodiment FIGS. 8A through 8C, equivalent segment ID stacks are limited to four segment IDs because of limitations of flow analysis capability.

Network portion 800 of FIG. 8A is similar to network portion 400 of FIG. 4A except that the network path is longer. Network nodes are designated by respective loopbacks A through I. In a manner similar to that described for network 400, respective adjacency segments 2020 through 2080 are assigned to the links running from nodes B to C, C to D, D to E, E to F, F to G, G to H, and H to I. Segment routing using the segment path defined by the adjacency statements results in a segment ID stack having 7 adjacency segment IDs between nodes A and B, decreasing by one segment ID for each node until the original packet P is routed by egress edge node I. These segment ID stacks are illustrated between the nodes of network 800 in FIG. 8A.

Turned to run vertically alongside the first six segment ID stacks in FIG. 8A are compression identifiers surrounded by dashed-line boxes. After network analysis of packet flow through network 800, compression IDs 8010 through 8060 are proposed to replace the top four segment IDs (or all of the segment IDs, if less than four) of the segment ID stack of a packet traveling between the pair of nodes corresponding to the compression ID. For example, compression ID 8010 is proposed in a communication between nodes A and B as a replacement for the stack of segment IDs 2020 through 2050.

FIG. 8B illustrates the segment ID stacks carried by a packet through network 800 if all of the proposed compression IDs shown in FIG. 8A are used. Arrangements between pairs of nodes involving respective compression IDs are designated using dashed-line arrows in the same manner as in FIGS. 4B-4C above. Use of compression IDs to replace up to four segment IDs in each segment ID stack results in the smaller segment ID stacks shown in FIG. 4B. Each of the first six segment ID stacks has a compression ID at the top of the stack, and each of the first three stacks includes a compression ID as well as an underlying adjacency segment ID. For example, the segment ID stack carried by a packet between nodes B and C in FIG. 8B includes compression ID 8020 at the top of the stack, as well as adjacency segment IDs 2070 and 2080.

If packet flow analysis is continued in network 800 after packets having the compressed segment ID stacks shown in FIG. 8B start flowing through the network, flows associated with the compressed segment ID stacks may become large enough that additional segment IDs to compress these segment ID stacks further are proposed. In the embodiment of FIG. 8B, compression IDs 8110, 8120 and 8130 are proposed to replace the top four segment IDs (or all of the segment IDs, if less than four) of the respective first three segment ID stacks. For example, compression ID 8110 is proposed in a communication between nodes A and B as a replacement for the compressed segment ID stack including compression ID 8010 and adjacency segment IDs 2060 through 2080.

FIG. 8C illustrates the segment ID stacks carried by a packet through network 800 if all of the proposed compression IDs shown in FIGS. 8A and 8B are used. For node pairs A-B, B-C, and C-D, repeated flow analysis has resulted in arrangements involving two compression IDs between the nodes in each pair. Compression of the first three segment ID stacks using both of the compression nodes in succession results in the compressed segment ID stacks of FIG. 8C. In FIG. 8C, the recursive nature of the compression process has resulted in a series of segment ID stacks resembling MPLS label swapping, like the series of FIG. 4C.

The embodiments described above involving methods of segment ID stack compression are merely exemplary. For example, although example segment ID stacks described herein are formed from adjacency segment IDs, nodal segment IDs could be used instead of or in addition to the adjacency segment IDs. The forms of example data structures described herein, including forwarding table and routing table portions, are merely exemplary. Other data structures and arrangements of information could be used, and in some embodiments compression identifiers are stored in a data structure separate from the routing table or forwarding table of a node. In an embodiment, logic external to a forwarding table is used instead of forwarding table stack instructions to implement the methods described herein. These and other variations and alternatives will be recognized by those of ordinary skill in the art in view of the teachings of this disclosure.

Figure 9:
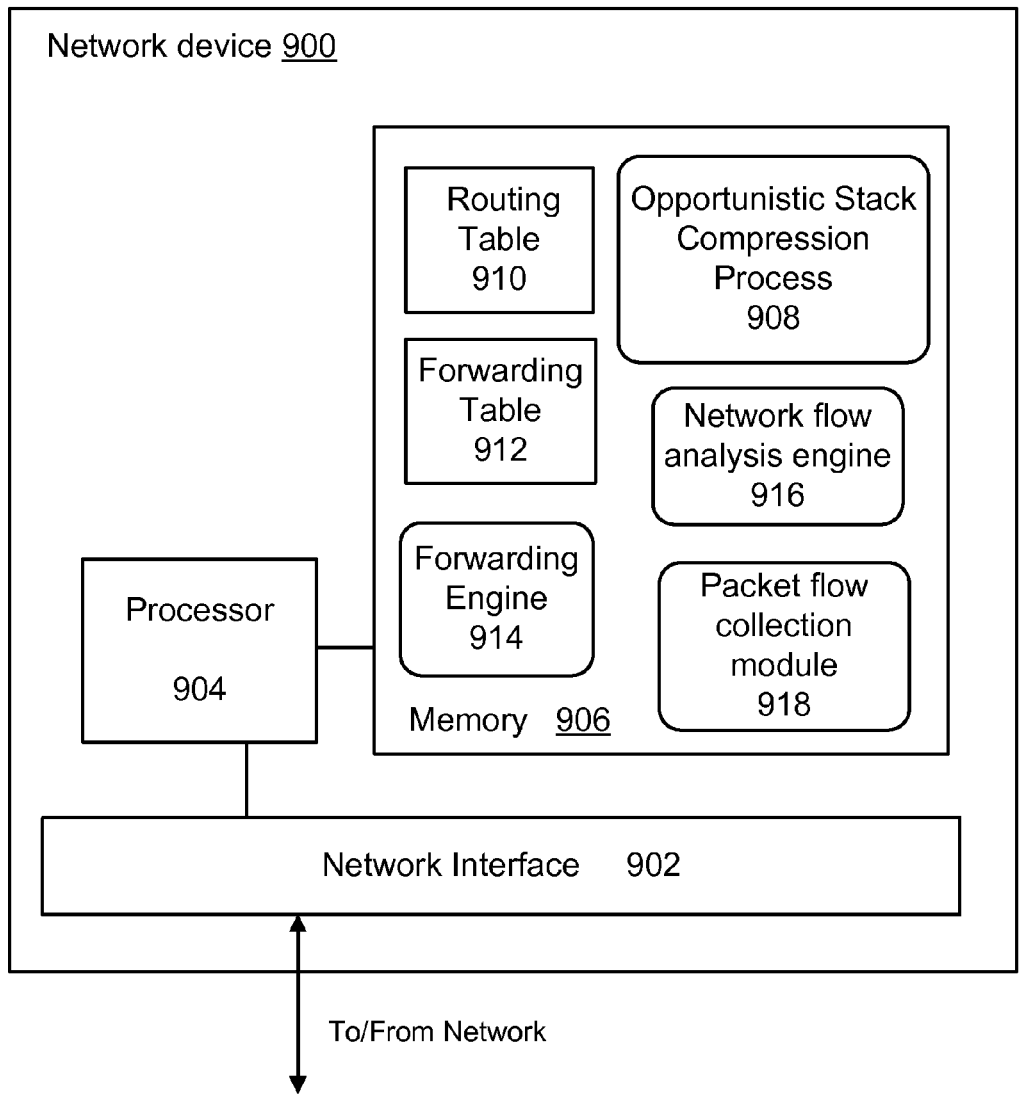
FIG. 9 is a block diagram illustrating an example of a network device that may be used according to the systems and methods described herein.

FIG. 9 is a block diagram of an exemplary embodiment of a network device that may perform methods as described herein. In an embodiment, network device 900 is within a network node. In an alternative embodiment, network device 900 is formed from a network node in communication with one or more other devices such as a network flow analyzer, network controller, or control plane server. In another alternative embodiment, network device 900 is formed from a centralized network controller or server configured to carry out the functions of one or more network nodes as well as the additional functions described herein for device 900. Network device 900 includes network interface 902 for connection to one or more networks. Network interface 902 contains the mechanical, electrical and signaling circuitry for communicating data over physical links coupled to a network such as network 100 of FIG. 1 or the networks of FIGS. 2-4 and 8. Network interface 902 may be configured to transmit and/or receive data using a variety of protocols and protocol suites, including MPLS, GMPLS, TCP/IP, SONET/SDH, Ethernet, OTN, and so forth. Network interface 902 may also be used to implement one or more virtual network interfaces, such as for Virtual Private Network (VPN) access. Network interface 902 is coupled to processor 904 and may also be coupled to memory 906 of network device 900.

Memory 906 includes a plurality of storage locations addressable by processor 904 and network interface 902 for storing software programs and data structures associated with the methods described herein. As such, memory 906 may be implemented using any combination of built-in volatile or non-volatile memory, including random-access memory (RAM) and read-only memory (ROM) and integrated or peripheral storage devices such as magnetic disks, optical disks, solid state drives or flash drives. In the embodiment of FIG. 9, memory 906 includes forwarding engine 914. Forwarding engine 914 includes computer executable instructions that when executed by processor 904 are operable to perform operations such as reading the top segment identifier in a segment ID stack associated with a packet or message, access a forwarding table such as forwarding table 916 to obtain forwarding instructions for the top segment identifier, and forward the packet or message according to the forwarding instructions. Memory 906 also includes routing table 910 and forwarding table 912 in the embodiment of FIG. 9. In an embodiment, routing table 910 and forwarding table 912 are similar to those described in connection with FIGS. 4A through 4C above.

In the embodiment of FIG. 9, memory 906 also includes packet flow collection module 918 and network flow analysis engine 916. Packet flow collection module 918 includes computer executable instructions that when executed by processor 904 are operable to receive and collect data such as that shown in FIG. 6 identifying flows associated with packets traveling through a node associated with network device 900. Packet flow collection module 918 may also include instructions executable to transfer collected flow data to an external data collection server or flow analyzer. Network flow analysis engine 916 includes computer executable instructions that when executed by processor 904 are operable to evaluate packet flow data and provide information regarding network flows, such as the flow ranking information shown in FIG. 6. In an alternative embodiment, network flow analysis engine 916 is external to and in communication with network device 900. In such an embodiment, network flow analysis engine 916 may form part of a network flow analyzer, control plane server, or network controller.

Memory 906 of network device 900 also includes opportunistic stack compression process 908. Opportunistic stack compression process 908 includes computer executable instructions that when executed by processor 904 are operable to, in conjunction with network flow analysis engine 916, implement processes such as those of FIGS. 5A through 5C for entering into arrangements with adjacent nodes for representing an equivalent segment identifier stack with a compression identifier. Opportunistic stack compression process 908 also includes instructions executable to implement, in conjunction with forwarding engine 914, a forwarding process such as that of FIG. 7 providing for opportunistic segment identifier stack compression.

Figure 10:
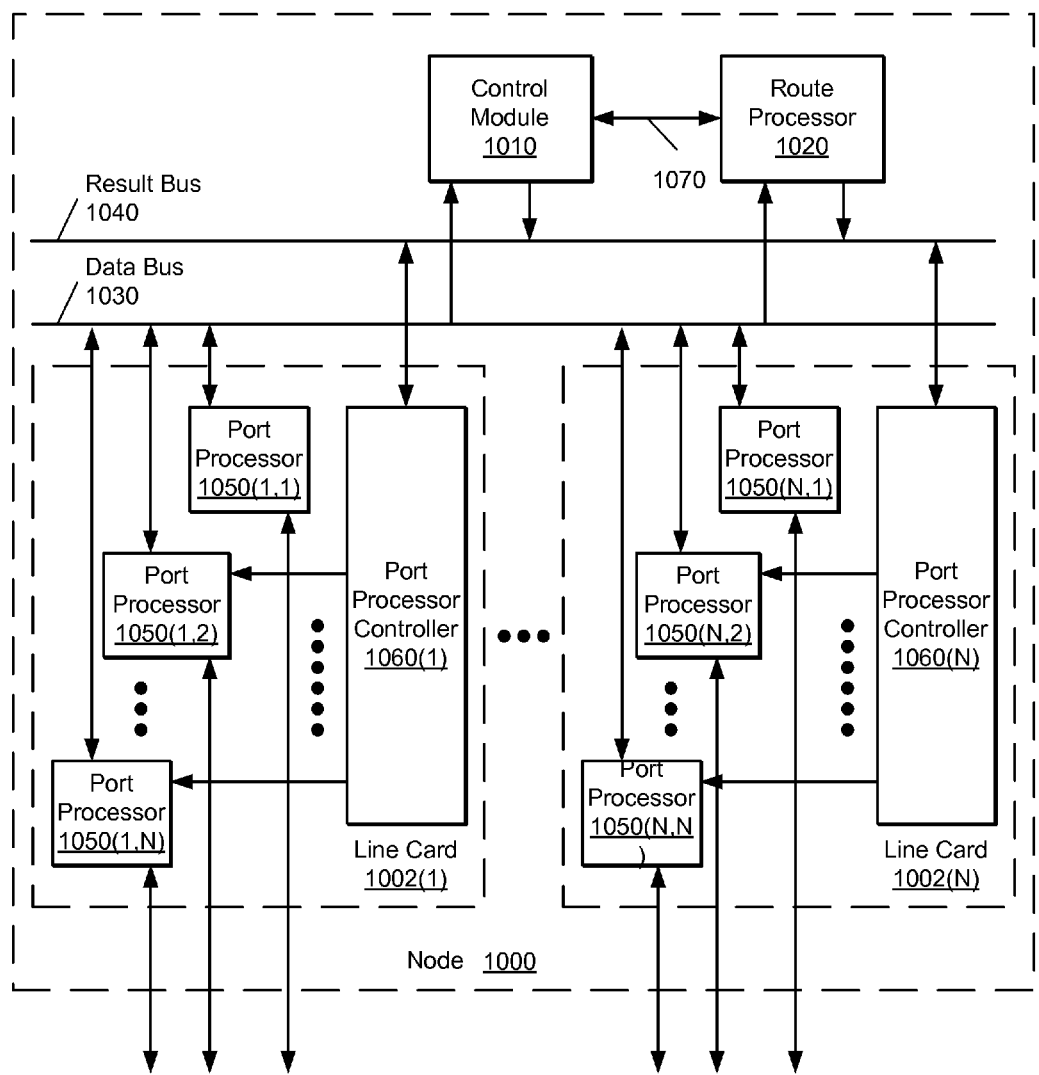
FIG. 10 is a block diagram illustrating certain components of an example node architecture that can be employed in the networks described herein.

FIG. 10 is a block diagram of an embodiment of a node 1000 that may be employed in the networks described herein. In this depiction, network device 1000 includes a number of line cards (line cards 1002(1)-1002(N)) that are communicatively coupled to a control module 1010 (which can include a forwarding engine, not shown) and a route processor 1020 via a data bus 1030 and a result bus 1040. Line cards 1002(1)-(N) include a number of port processors 1050(1, 1)-1050(N, N) which are controlled by port processor controllers 1060(1)-1060(N). It will also be noted that control module 1010 and route processor 1020 are not only coupled to one another via data bus 1030 and result bus 1040, but are also communicatively coupled to one another by a communications link 1070. In alternative embodiments, each line card can include its own forwarding engine.

When a message or packet is received, the message is identified and analyzed by a node such as node 1000 in the following manner Upon receipt, a message (or some or all of its control information) is sent from one of the port processors 1050(1, 1)-1050(N, N) at which the message was received to one or more of those devices coupled to data bus 1030 (e.g., others of port processors 1050(1, 1)-1050(N, N), a forwarding engine, and/or route processor 1020). Handling of the message can be determined, for example, by a forwarding engine. For example, a forwarding engine may determine that the message should be forwarded to one or more of port processors 1050(1, 1)-1050(N, N). This can be accomplished by indicating to corresponding one(s) of port processor controllers 1060(1)-1060(N) that the copy of the message held in the given one(s) of port processors 1050(1, 1)-1050(N, N) should be forwarded to the appropriate one of port processors 1050(1, 1)-1050(N, N). In this example, the segment routing enabled routing and forwarding functionality described above with respect to, for example, FIG. 3 can be implemented in control module 1010 and/or route processor 1020.

As will be appreciated in light of the present disclosure, processes according to concepts embodied by systems such as those described herein include one or more operations, which may be performed in any appropriate order. The operations referred to herein may be modules or portions of modules (e.g., software, firmware or hardware modules). For example, although the described embodiment includes software modules, the various example modules may be application specific hardware modules. The software modules discussed herein may include script, batch or other executable files, or combinations and/or portions of such files. The software modules may include a computer program or subroutines thereof encoded on computer-readable storage media.

Additionally, it will be apparent to those skilled in the art in light of the present disclosure that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize in light of the present disclosure that the operations described in example embodiments are for illustration only. Operations may be combined or the functionality of the operations may be distributed in additional operations in accordance with the methods and systems disclosed herein.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims. For example, it should be appreciated by those skilled in the art in view of the present disclosure that, unless otherwise indicated, modifications and variations described with respect to one embodiment are applicable to other similar embodiments.

What is claimed is:

1. A method, comprising:
    participating in routing of a first data packet through a first node in a segment routing enabled network, wherein
        the first data packet comprises a first plurality of routing segment identifiers,
        each of multiple additional data packets to be routed through the first node also comprises the first plurality of routing segment identifiers, and
        one or more of the first plurality of routing segment identifiers is stored in a segment routing forwarding table at the first node;
    subsequent to said participating in routing of the first data packet, entering into an arrangement with an adjacent node in the segment routing enabled network, wherein
        the arrangement comprises representation of the first plurality of routing segment identifiers by a single compression identifier; and
    participating in routing of at least one of said additional data packets, wherein
        the at least one of said additional data packets as routed comprises the single compression identifier instead of the first plurality of routing segment identifiers, and
        the compression identifier is stored in the segment routing forwarding table at the first node.

2. The method of claim 1, wherein said participating in routing comprises receiving.

3. The method of claim 1, wherein said participating in routing comprises sending.

4. The method of claim 1, wherein said routing segment identifiers comprise Multiprotocol Label Switching (MPLS) labels.

5. The method of claim 1, wherein the first data packet and the additional data packets comprise internet protocol (IP) extension headers.

6. The method of claim 1, further comprising:
    subsequent to said participating in routing of a first data packet, and prior to said entering into an arrangement, determining that use of the single compression identifier to replace the first plurality of routing segment identifiers within one or more of said additional data packets is associated with a potential network improvement.

7. The method of claim 6, wherein said determining comprises evaluating network flow analysis information.

8. The method of claim 7, wherein said network flow analysis information comprises
    a prevalence, among data packets routed through the first node, of data packets comprising the first plurality of segment identifiers.

9. The method of claim 7, wherein said network flow analysis information comprises
    a quality of service parameter for data packets comprising the first plurality of segment identifiers.

10. The method of claim 1, wherein said arrangement further comprises
    an expiration time for said use of the single compression identifier to represent the first plurality of routing segment identifiers.

11. The method of claim 1, wherein said entering into an arrangement with an adjacent node comprises sending to the adjacent node a proposal for representation of the first plurality of routing segment identifiers by the single compression identifier.

12. The method of claim 2, wherein said entering into an arrangement with an adjacent node comprises sending to the adjacent node a proposal for representation of the first plurality of routing segment identifiers by the single compression identifier.

13. The method of claim 3, wherein said entering into an arrangement with an adjacent node comprises sending to the adjacent node a proposal for representation of the first plurality of routing segment identifiers by the single compression identifier.

14. The method of claim 1, wherein said entering into an arrangement with an adjacent node comprises receiving from the adjacent node a proposal for representation of the first plurality of routing segment identifiers by the single compression identifier.

15. A network device associated with a node in a segment routing enabled network, the network device comprising:
one or more network interfaces;
a memory storing a segment routing forwarding table; and
a processor configured to:
participate in routing of a first data packet through the node in the segment routing enabled network via at least one of the network interfaces, wherein the first data packet comprises a first plurality of routing segment identifiers, each of multiple additional data packets to be routed through the node also comprises the first plurality of routing segment identifiers, and one or more of the first plurality of routing segment identifiers is stored in the segment routing forwarding table;
subsequent to said participating in routing of the first data packet, enter into an arrangement with an adjacent node in the segment routing enabled network, wherein the arrangement comprises representation of the first plurality of routing segment identifiers by a single compression identifier;
create an entry in the segment routing forwarding table reflecting the arrangement; and
participate in routing of at least one of said additional data packets using the forwarding table, wherein the at least one of said additional data packets as routed comprises the single compression identifier instead of the first plurality of routing segment identifiers, and the compression identifier is stored in the segment routing forwarding table.

16. The network device of claim 15, wherein the processor is further configured to, subsequent to said participating in routing of a first data packet, and prior to said entering into an arrangement, determine that use of the single compression identifier to replace the first plurality of routing segment identifiers within one or more of said additional headers is associated with a potential network improvement.

17. The network device of claim 16, wherein the processor is further configured to evaluate network flow analysis information to determine that use of the single compression identifier to replace the first plurality of routing segment identifiers within one or more of said additional headers is associated with the potential network improvement.

18. The network device of claim 17, further comprising a network flow analysis engine configured to provide network flow analysis information for data packets routed through the network node.

19. The network device of claim 15, further comprising a forwarding engine configured to send a data packet from the network node to another network node via at least one of the network interfaces.

20. The network device of claim 15, wherein the entry in the segment routing forwarding table comprises:
the single compression identifier; and
the plurality of routing segment identifiers represented by the single compression identifier.

21. The network device of claim 20, wherein the entry in the forwarding table further comprises an expiration time for the arrangement.

22. The method of claim 5, wherein the at least one of the additional data packets as routed comprises the single compression identifier written into an IP address field of the at least one of the additional data packets.

* * * * *

UNITED STATES PATENT AND TRADEMARK OFFICE
CERTIFICATE OF CORRECTION

PATENT NO. : 9,537,769 B2
APPLICATION NO. : 14/449632
DATED : January 3, 2017
INVENTOR(S) : Stewart F. Bryant and Daniel C. Frost It is certified that error appears in the above-identified patent and that said Letters Patent is hereby corrected as shown below:

On the Title Page

Page 3, item (56), right column:
Line 65, please replace "draft-previdi-filsfils-isis-segment-routing-00" with "draft-previdi-filsfils-isis-segment-routing-02"

Signed and Sealed this
Eleventh Day of April, 2017

Michelle K. Lee
*Director of the United States Patent and Trademark Office*